(12) United States Patent
Emura

(10) Patent No.: US 10,940,916 B2
(45) Date of Patent: Mar. 9, 2021

(54) BICYCLE REAR SPROCKET, BICYCLE REAR SPROCKET ASSEMBLY, AND BICYCLE DRIVE TRAIN

(71) Applicant: SHIMANO INC., Sakai (JP)

(72) Inventor: Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 589 days.

(21) Appl. No.: 15/705,401

(22) Filed: Sep. 15, 2017

(65) Prior Publication Data
US 2019/0084645 A1 Mar. 21, 2019

(51) Int. Cl.
| B62M 9/12 | (2006.01) |
| F16G 13/06 | (2006.01) |
| F16H 55/30 | (2006.01) |
| F16H 57/00 | (2012.01) |
| B62M 9/00 | (2006.01) |

(52) U.S. Cl.
CPC .............. *B62M 9/12* (2013.01); *F16G 13/06* (2013.01); *F16H 55/30* (2013.01); *F16H 57/0025* (2013.01); *B62M 2009/005* (2013.01)

(58) Field of Classification Search
CPC ............................ F16H 57/0025; F16G 13/06
See application file for complete search history.

(56) References Cited

U.S. PATENT DOCUMENTS

| 9,403,578 B1 * | 8/2016 | Yoshida .................... B62M 9/10 |
| 2005/0079940 A1 * | 4/2005 | Reiter ...................... F16H 55/30 |
| | | 474/160 |
| 2007/0265122 A1 * | 11/2007 | Emura .................... B62M 9/105 |
| | | 474/152 |
| 2011/0193406 A1 * | 8/2011 | Chiang ................. B60B 27/023 |
| | | 301/110.5 |
| 2013/0139642 A1 * | 6/2013 | Reiter ...................... F16H 55/30 |
| | | 74/594.2 |
| 2015/0191214 A1 * | 7/2015 | Emura ...................... B62M 3/00 |
| | | 74/594.2 |
| 2015/0198231 A1 * | 7/2015 | Emura .................... B62M 9/105 |
| | | 474/156 |
| 2015/0210353 A1 * | 7/2015 | Tokuyama ............... B62M 9/12 |
| | | 474/160 |
| 2015/0308542 A1 | 10/2015 | Fukumori et al. |
| 2016/0059930 A1 * | 3/2016 | Fukunaga ................ B62M 9/10 |
| | | 474/160 |
| 2016/0280325 A1 * | 9/2016 | Watarai ................... F16H 55/30 |

\* cited by examiner

*Primary Examiner* — Michael R Mansen
*Assistant Examiner* — Mark K Buse
(74) *Attorney, Agent, or Firm* — Mori & Ward, LLP

(57) ABSTRACT

A bicycle rear sprocket comprises a sprocket body and a plurality of sprocket teeth. The plurality of sprocket teeth includes a plurality of first teeth. Each tooth of the plurality of first teeth has a driving surface and a non-driving surface provided on a reverse side of the driving surface in a circumferential direction with respect to the rotational center axis. Each tooth of the plurality of first teeth has an axial maximum tooth-width and an axial driving-surface tooth-width. The axial maximum tooth-width is defined in an axial direction of the rotational center axis as a maximum width in each tooth of the plurality of first teeth. The axial driving-surface tooth-width is smaller than the axial maximum tooth-width. The plurality of first teeth accounts for at least 25% of the plurality of sprocket teeth.

20 Claims, 20 Drawing Sheets

BICYCLE REAR SPROCKET, BICYCLE REAR SPROCKET ASSEMBLY, AND BICYCLE DRIVE TRAIN

BACKGROUND OF THE INVENTION

Field of the Invention

The present invention relates to a bicycle rear sprocket, a bicycle rear sprocket assembly, and a bicycle drive train.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle rear sprocket comprises a sprocket body and a plurality of sprocket teeth. The plurality of sprocket teeth extends radially outwardly from the sprocket body with respect to a rotational center axis of the bicycle rear sprocket. The plurality of sprocket teeth includes a plurality of first teeth. Each tooth of the plurality of first teeth has a driving surface and a non-driving surface provided on a reverse side of the driving surface in a circumferential direction with respect to the rotational center axis. Each tooth of the plurality of first teeth has an axial maximum tooth-width and an axial driving-surface tooth-width. The axial maximum tooth-width is defined in an axial direction of the rotational center axis as a maximum width in each tooth of the plurality of first teeth. The axial maximum tooth-width is defined on a pitch circle of the bicycle rear sprocket. The axial driving-surface tooth-width is defined in the axial direction on the driving surface. The axial maximum tooth-width is larger than 1.6 mm. The axial driving-surface tooth-width is smaller than the axial maximum tooth-width. The plurality of first teeth accounts for at least 25% of the plurality of sprocket teeth.

With the bicycle rear sprocket according to the first aspect, it is possible to make rotation of the bicycle rear sprocket smooth even if a bicycle chain is inclined relative to a reference plane perpendicular to the rotational center axis.

In accordance with a second aspect of the present invention, a bicycle rear sprocket comprises sprocket body and a plurality of sprocket teeth. The plurality of sprocket teeth extends radially outwardly from the sprocket body with respect to a rotational center axis of the bicycle rear sprocket. The plurality of sprocket teeth includes a plurality of first teeth. Each tooth of the plurality of first teeth has a driving surface and a non-driving surface provided on a reverse side of the driving surface in a circumferential direction with respect to the rotational center axis. Each tooth of the plurality of first teeth has an axial maximum tooth-width and an axial driving-surface tooth-width. The axial maximum tooth-width is defined in an axial direction of the rotational center axis as a maximum width in each tooth of the plurality of first teeth. The axial maximum tooth-width is defined on a pitch circle of the bicycle rear sprocket. The axial driving-surface tooth-width is defined in the axial direction on the driving surface. The axial maximum tooth-width is larger than a width of a roller of a bicycle chain configured to engage with the bicycle rear sprocket. The axial driving-surface tooth-width is smaller than the width of the roller. The plurality of first teeth accounts for at least 25% of the plurality of sprocket teeth.

With the bicycle rear sprocket according to the second aspect, it is possible to make rotation of the bicycle rear sprocket smooth even if a bicycle chain is inclined relative to a reference plane perpendicular to the rotational center axis.

In accordance with a third aspect of the present invention, the bicycle rear sprocket according to the first or second aspect is configured so that each tooth of the plurality of first teeth has the axial maximum tooth-width in an area defined to overlap with an inner link plate of a bicycle chain configured to engage with the bicycle rear sprocket when viewed in the axial direction.

With the bicycle rear sprocket according to the third aspect, it is possible to make rotation of the bicycle rear sprocket smoother even if the bicycle chain is inclined relative to the reference plane perpendicular to the rotational center axis.

In accordance with a fourth aspect of the present invention, the bicycle rear sprocket according to any one of the first to third aspects is configured so that the plurality of first teeth accounts for all teeth of the plurality of sprocket teeth.

With the bicycle rear sprocket according to the fourth aspect, it is possible to make rotation of the bicycle rear sprocket smoother even if the bicycle chain is inclined relative to the reference plane perpendicular to the rotational center axis.

In accordance with a fifth aspect of the present invention, the bicycle rear sprocket according to any one of the first to fourth aspects is configured so that each tooth of the plurality of first teeth includes a first axial surface facing in the axial direction, a first additional axial surface facing in the axial direction, and a chamfer. The first additional axial surface is provided on a reverse side of the first axial surface in the axial direction. The axial maximum tooth-width is defined between the first axial surface and the first additional axial surface in the axial direction. The chamfer is provided between the first axial surface and the driving surface.

With the bicycle rear sprocket according to the fifth aspect, it is possible to make rotation of the bicycle rear sprocket smoother even if the bicycle chain is inclined relative to the reference plane perpendicular to the rotational center axis.

In accordance with a sixth aspect of the present invention, the bicycle rear sprocket according to the fifth aspect is configured so that the chamfer is closer to the first axial surface than the first additional axial surface.

With the bicycle rear sprocket according to the sixth aspect, it is possible to make rotation of the bicycle rear sprocket smoother even if the bicycle chain is inclined relative to the reference plane perpendicular to the rotational center axis.

In accordance with a seventh aspect of the present invention, the bicycle rear sprocket according to the fifth or sixth aspect is configured so that the axial driving-surface tooth-width is defined between the chamfer and the first additional axial surface on the driving surface.

With the bicycle rear sprocket according to the seventh aspect, it is possible to make rotation of the bicycle rear sprocket smoother even if the bicycle chain is inclined relative to the reference plane perpendicular to the rotational center axis.

In accordance with an eighth aspect of the present invention, the bicycle rear sprocket according to any one of the fifth to seventh aspects is configured so that the first axial surface is provided between the first additional axial surface and a bicycle frame in the axial direction in a state where the bicycle rear sprocket is mounted to the bicycle frame.

With the bicycle rear sprocket according to the eighth aspect, it is possible to make rotation of the bicycle rear sprocket smoother even if the bicycle chain is inclined relative to the reference plane when the bicycle rear sprocket corresponds to low gear.

In accordance with a ninth aspect of the present invention, the bicycle rear sprocket according to any one of the fifth to eighth aspects is configured so that the chamfer includes a radially outer end and a radially inner end. The chamfer has a maximum circumferential width defined in the circumferential direction. The maximum circumferential width is defined at a radial position provided between the radially outer end and the radially inner end.

With the bicycle rear sprocket according to the ninth aspect, it is possible to make rotation of the bicycle rear sprocket smoother even if the bicycle chain is inclined relative to the reference plane perpendicular to the rotational center axis.

In accordance with a tenth aspect of the present invention, the bicycle rear sprocket according to any one of the first to ninth aspects is configured so that the axial maximum tooth-width is larger than 1.9 mm.

With the bicycle rear sprocket according to the tenth aspect, the axial maximum tooth-width improves chain-holding performance of the bicycle rear sprocket.

In accordance with an eleventh aspect of the present invention, the bicycle rear sprocket according to any one of the first to tenth aspects is configured so that at least one of the sprocket body and the plurality of sprocket teeth is made of a first metallic material.

With the bicycle rear sprocket according to the eleventh aspect, the first metallic material increases strength of the bicycle rear sprocket.

In accordance with a twelfth aspect of the present invention, the bicycle rear sprocket according to the eleventh aspect is configured so that the first metallic material includes aluminum.

With the bicycle rear sprocket according to the twelfth aspect, the first metallic material saves a weight of the bicycle rear sprocket with increasing strength of the bicycle rear sprocket.

In accordance with a thirteenth aspect of the present invention, the bicycle rear sprocket according to any one of the first to twelfth aspects is configured so that the plurality of sprocket teeth includes at least 28 sprocket teeth.

With the bicycle rear sprocket according to the thirteenth aspect, it is possible to make rotation of the bicycle rear sprocket smoother even if the bicycle chain is inclined relative to the reference plane perpendicular to the rotational center axis.

In accordance with a fourteenth aspect of the present invention, the bicycle rear sprocket according to any one of the first to thirteenth aspects is configured so that the plurality of first teeth is a plurality of driving teeth.

With the bicycle rear sprocket according to the fourteenth aspect, it is possible to make rotation of the bicycle rear sprocket smoother even if the bicycle chain is inclined relative to the reference plane perpendicular to the rotational center axis.

In accordance with a fifteenth aspect of the present invention, a bicycle rear sprocket assembly comprises the bicycle rear sprocket according to any one of the first to fourteenth aspects. The bicycle rear sprocket has a first pitch-circle diameter. The first pitch-circle diameter is the largest pitch-circle diameter in the bicycle rear sprocket assembly.

With the bicycle rear sprocket assembly according to the fifteenth aspect, it is possible to make rotation of the bicycle rear sprocket smoother even if the bicycle chain is inclined relative to the reference plane when the bicycle rear sprocket corresponds to low gear.

In accordance with a sixteenth aspect of the present invention, the bicycle rear sprocket assembly according to any one of the first to fourteenth aspects further comprises a hub engagement part configured to engage with the bicycle hub assembly.

With the bicycle rear sprocket assembly according to the sixteenth aspect, it is possible to make rotation of the bicycle rear sprocket smoother even if the bicycle chain is inclined relative to the reference plane when the bicycle rear sprocket comprises the hub engagement part.

In accordance with a seventeenth aspect of the present invention, the bicycle rear sprocket assembly according to the sixteenth aspect further comprises a sprocket support configured to engage with the bicycle hub assembly. The sprocket support includes a sprocket attachment part. The bicycle rear sprocket is attached to the sprocket attachment part.

With the bicycle rear sprocket assembly according to the seventeenth aspect, it is possible to make rotation of the bicycle rear sprocket smoother even if the bicycle chain is inclined relative to the reference plane when the bicycle rear sprocket comprises the hub engagement part.

In accordance with an eighteenth aspect of the present invention, the bicycle rear sprocket assembly according to the seventeenth aspect is configured so that the sprocket support includes the hub engagement part configured to engage with the bicycle hub assembly.

With the bicycle rear sprocket assembly according to the eighteenth aspect, it is possible to make rotation of the bicycle rear sprocket smoother even if the bicycle chain is inclined relative to the reference plane when the bicycle rear sprocket comprises the hub engagement part.

In accordance with a nineteenth aspect of the present invention, a bicycle drive train comprises the bicycle rear sprocket according to any one of the first to fourteenth aspects and a bicycle chain. The bicycle rear sprocket is configured to engage with the bicycle chain. The bicycle chain includes an inner link plate having a longitudinal centerline defining a longitudinal direction. The inner link plate comprises a first inner-link end portion, a second inner-link end portion, and a first inner-link intermediate portion. The first inner-link end portion includes a first inner-link opening having a first inner-link center axis. The second inner-link end portion includes a second inner-link opening having a second inner-link center axis extending along the first inner-link center axis. The first inner-link intermediate portion interconnects the first inner-link end portion and the second inner-link end portion. The first inner-link end portion includes an extended edge portion extending away from the second inner-link end portion in the longitudinal direction.

With the bicycle drive train according to the nineteenth aspect, it is possible to make rotation of the bicycle rear sprocket smoother even if the bicycle chain is inclined relative to the reference plane when the bicycle chain comprises the extended edge portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
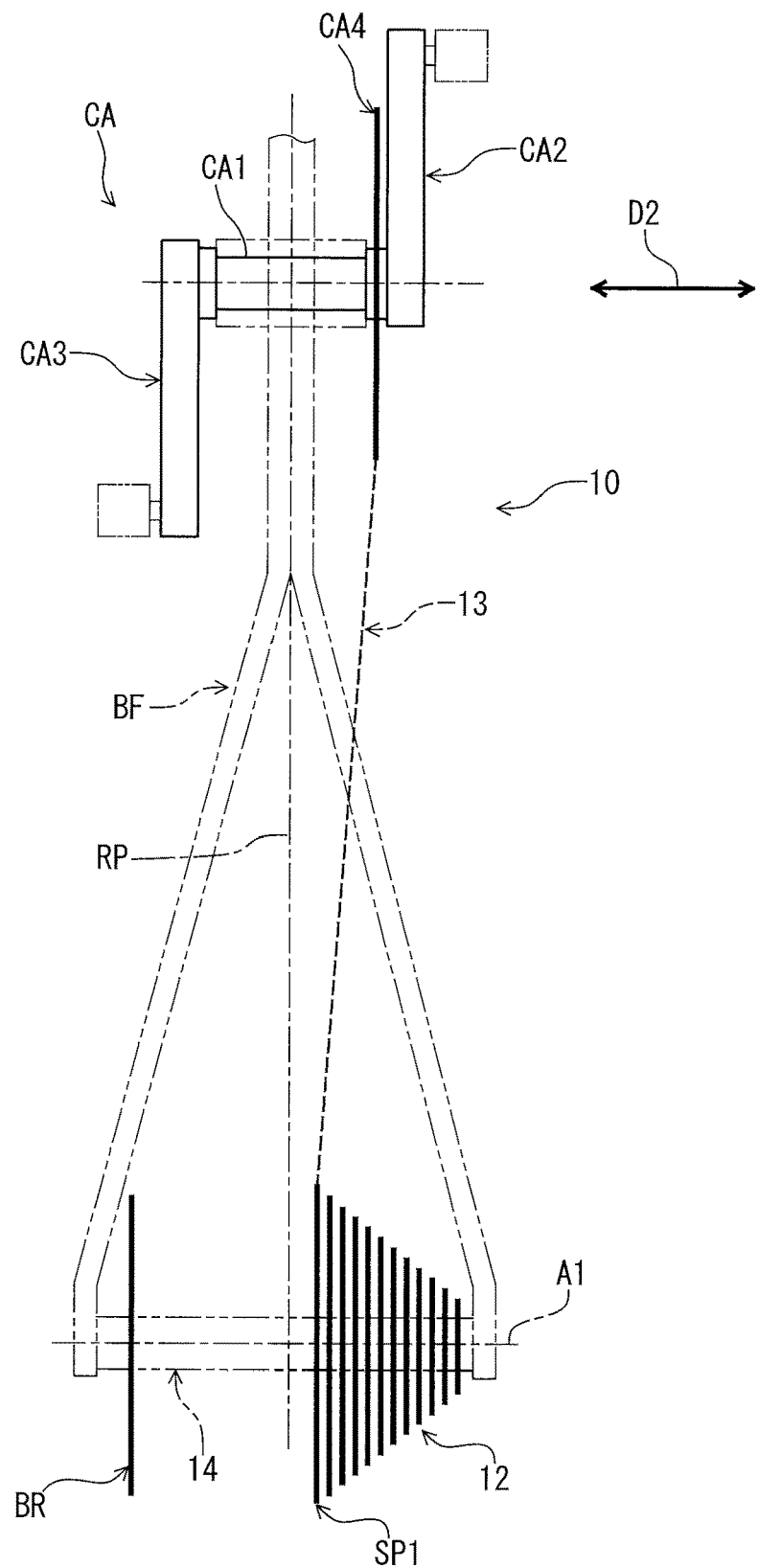
FIG. 1 is a schematic diagram of a bicycle drive train in accordance with an embodiment.

The embodiment(s) will now be described with reference to the accompanying drawings, wherein like reference numerals designate corresponding or identical elements throughout the various drawings.

Referring initially to FIG. 1, a bicycle drive train 10 in accordance with an embodiment comprises a bicycle rear sprocket assembly 12 and a bicycle chain 13. The bicycle rear sprocket assembly 12 is configured to engage with the bicycle chain 13. The bicycle drive train 10 comprises a bicycle hub assembly 14. The bicycle hub assembly 14 is secured to a bicycle frame BF. The bicycle rear sprocket assembly 12 is mounted on the bicycle hub assembly 14. A bicycle brake rotor BR is mounted on the bicycle hub assembly 14.

The bicycle drive train 10 further comprises a crank assembly CA. The crank assembly CA includes a crank axle CA1, a right crank arm CA2, a left crank arm CA3, and a front sprocket CA4. The right crank arm CA2 and the left crank arm CA3 are secured to the crank axle CA1. The front sprocket CA4 is secured to at least one of the crank axle CA1 and the right crank arm CA2. The bicycle chain 13 is engaged with the front sprocket CA4 and the bicycle rear sprocket assembly 12 to transmit a pedaling force from the front sprocket CA4 to the bicycle rear sprocket assembly 12. The crank assembly CA includes the front sprocket CA4 as a single sprocket in the illustrated embodiment. However, the crank assembly CA can include a plurality of front sprockets. The bicycle rear sprocket assembly 12 is a rear sprocket assembly. However, structures of the bicycle rear sprocket assembly 12 can be applied to the front sprocket.

Figure 2:
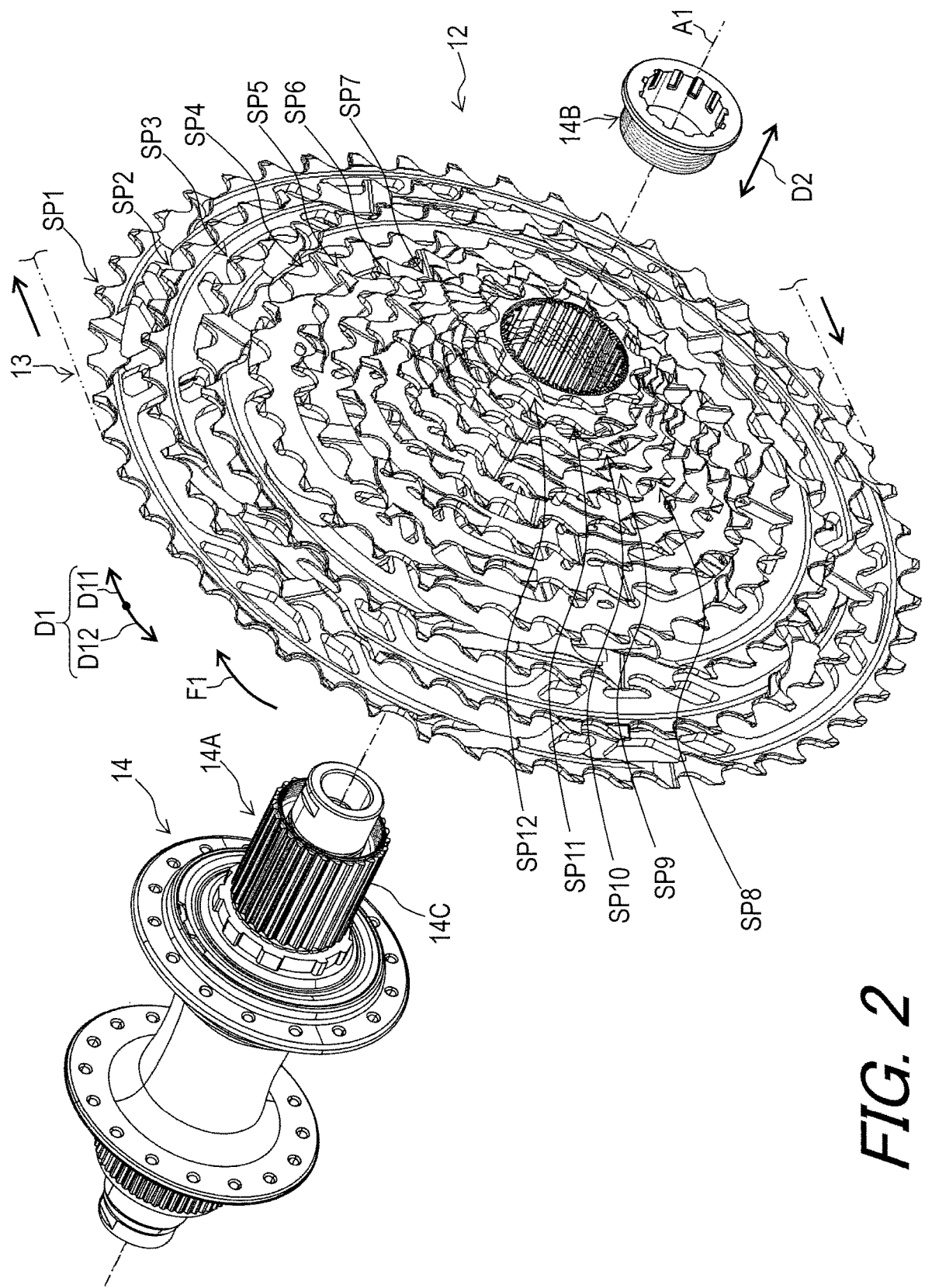
FIG. 2 is a perspective view of a bicycle rear sprocket assembly including a bicycle rear sprocket in accordance with an embodiment, with a bicycle hub assembly and a lock ring.

As seen in FIG. 2, the bicycle rear sprocket assembly 12 comprising a bicycle rear sprocket SP1 Namely, the bicycle drive train 10 (FIG. 1) comprises the bicycle rear sprocket SP1 and the bicycle chain 13 The bicycle rear sprocket assembly 12 in accordance with the embodiment comprises a plurality of bicycle rear sprockets SP1 to SP12. However, a total number of sprockets of the bicycle rear sprocket assembly 12 is not limited to this embodiment.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle drive train 10, the bicycle rear sprocket assembly 12, or the bicycle rear sprocket SP1 should be interpreted relative to the bicycle equipped with the bicycle drive train 10, the bicycle rear sprocket assembly 12, or the bicycle rear sprocket SP1 as used in an upright riding position on a horizontal surface.

As seen in FIG. 2, the bicycle rear sprocket assembly 12 has a rotational center axis A1. The bicycle rear sprocket assembly 12 is rotatably supported by the bicycle hub assembly 14 relative to the bicycle frame BF (FIG. 1) about the rotational center axis A1. The bicycle rear sprocket assembly 12 is secured to a sprocket support body 14A of the bicycle hub assembly 14 with a lock ring 14B. The bicycle rear sprocket assembly 12 is configured to be engaged with the bicycle chain 13 to transmit a driving rotational force F1 between the bicycle chain 13 and the bicycle rear sprocket assembly 12 during pedaling. The bicycle rear sprocket assembly 12 is rotated about the rotational center axis A1 in a driving rotational direction D11 during pedaling. The driving rotational direction D11 is defined along a circumferential direction D1 of the bicycle hub assembly 14 or the bicycle rear sprocket assembly 12. A reverse rotational direction D12 is an opposite direction of the driving rotational direction D11 and is defined along the circumferential direction D1.

Figure 3:
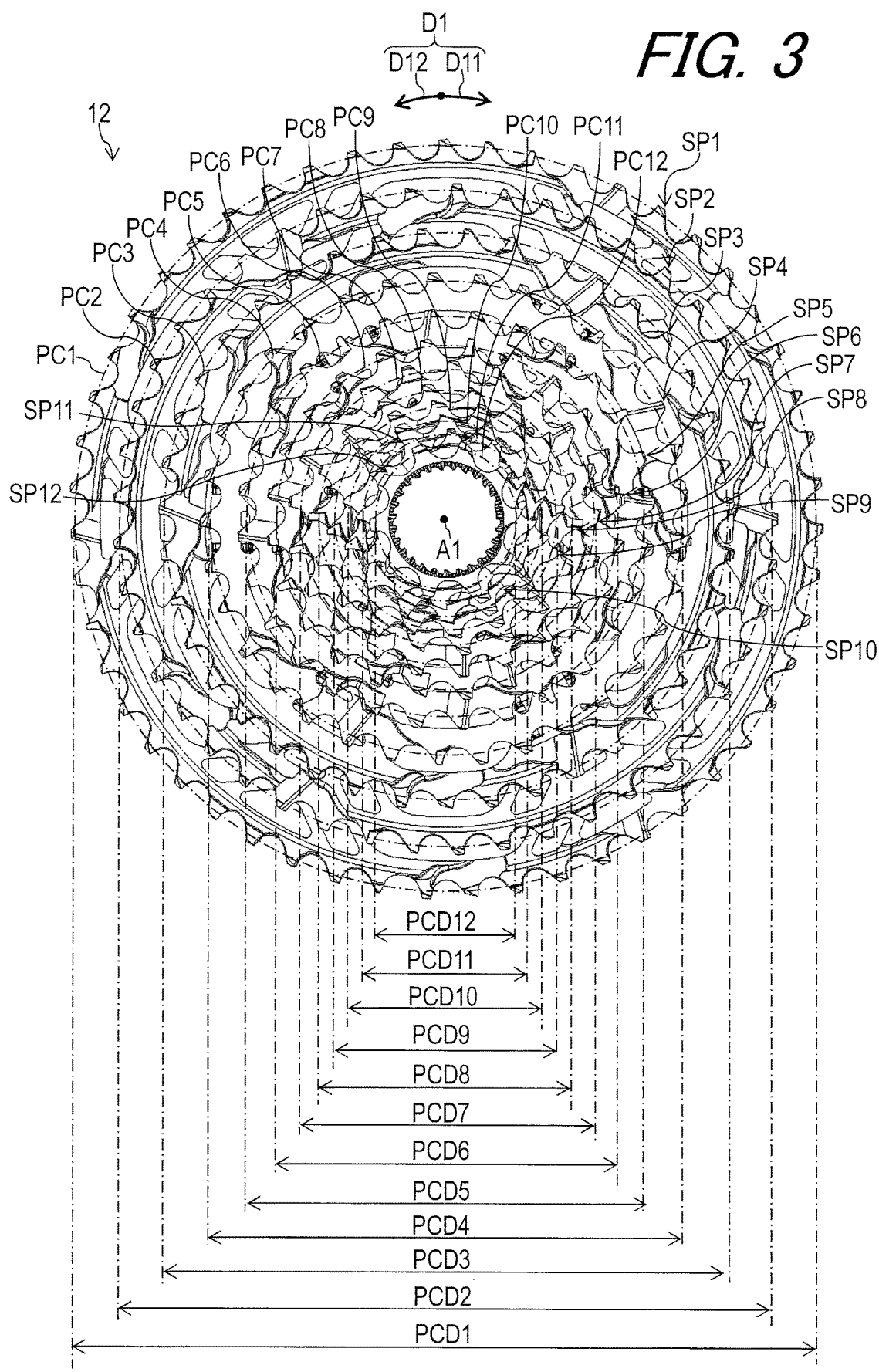
FIG. 3 is a side elevational view of the bicycle rear sprocket assembly illustrated in FIG. 1.

As seen in FIG. 3, the bicycle rear sprocket SP1 has a first pitch-circle diameter PCD1. The bicycle rear sprocket SP2 has a second pitch-circle diameter PCD2. The bicycle rear sprocket SP3 has a third pitch-circle diameter PCD3. The bicycle rear sprocket SP4 has a fourth pitch-circle diameter PCD4. The bicycle rear sprocket SP5 has a fifth pitch-circle diameter PCD5. The bicycle rear sprocket SP6 has a sixth pitch-circle diameter PCD6. The bicycle rear sprocket SP7 has a seventh pitch-circle diameter PCD7. The bicycle rear sprocket SP8 has an eighth pitch-circle diameter PCD8. The bicycle rear sprocket SP9 has a ninth pitch-circle diameter PCD9. The bicycle rear sprocket SP10 has a tenth pitch-circle diameter PCD10. The bicycle rear sprocket SP11 has an eleventh pitch-circle diameter PCD11. The bicycle rear sprocket SP12 has a twelfth pitch-circle diameter PCD12.

The bicycle rear sprocket SP1 has a pitch circle PC1 having the first pitch-circle diameter PCD1. The bicycle rear sprocket SP2 has a pitch circle PC2 having the second pitch-circle diameter PCD2. The bicycle rear sprocket SP3 has a pitch circle PC3 having the third pitch-circle diameter PCD3. The bicycle rear sprocket SP4 has a pitch circle PC4 having the fourth pitch-circle diameter PCD4. The bicycle rear sprocket SP5 has a pitch circle PC5 having the fifth pitch-circle diameter PCD5. The bicycle rear sprocket SP6 has a pitch circle PC6 having the sixth pitch-circle diameter PCD6. The bicycle rear sprocket SP7 has a pitch circle PC7 having the seventh pitch-circle diameter PCD7. The bicycle rear sprocket SP8 has a pitch circle PC8 having the eighth pitch-circle diameter PCD8. The bicycle rear sprocket SP9 has a pitch circle PC9 having the ninth pitch-circle diameter PCD9. The bicycle rear sprocket SP10 has a pitch circle PC10 having the tenth pitch-circle diameter PCD10. The bicycle rear sprocket SP11 has a pitch circle PC11 having the eleventh pitch-circle diameter PCD11. The bicycle rear sprocket SP12 has a pitch circle PC12 having the twelfth pitch-circle diameter PCD12.

The pitch circle PC1 is defined by center axes of pins of the bicycle chain 13 (FIG. 2) engage with the bicycle rear sprocket SP1. The pitch circles PC2 to PC12 are defined as well as the pitch circle PC1. Thus, they will not be descried in detail here for the sake of brevity.

In this embodiment, the first pitch-circle diameter PCD1 is larger than the second pitch-circle diameter PCD2. The second pitch-circle diameter PCD2 is larger than the third pitch-circle diameter PCD3. The third pitch-circle diameter PCD3 is larger than the fourth pitch-circle diameter PCD4. The first pitch-circle diameter PCD1 is the largest pitch-circle diameter in the bicycle rear sprocket assembly 12. The twelfth pitch-circle diameter PCD12 is the smallest pitch-circle diameter in the bicycle rear sprocket assembly 12. The bicycle rear sprocket SP1 corresponds to low gear in the bicycle rear sprocket assembly 12. The bicycle rear sprocket SP12 corresponds to top gear in the bicycle rear sprocket assembly 12. However, the bicycle rear sprocket SP1 can correspond to another gear in the bicycle rear sprocket assembly 12.

Figure 4:
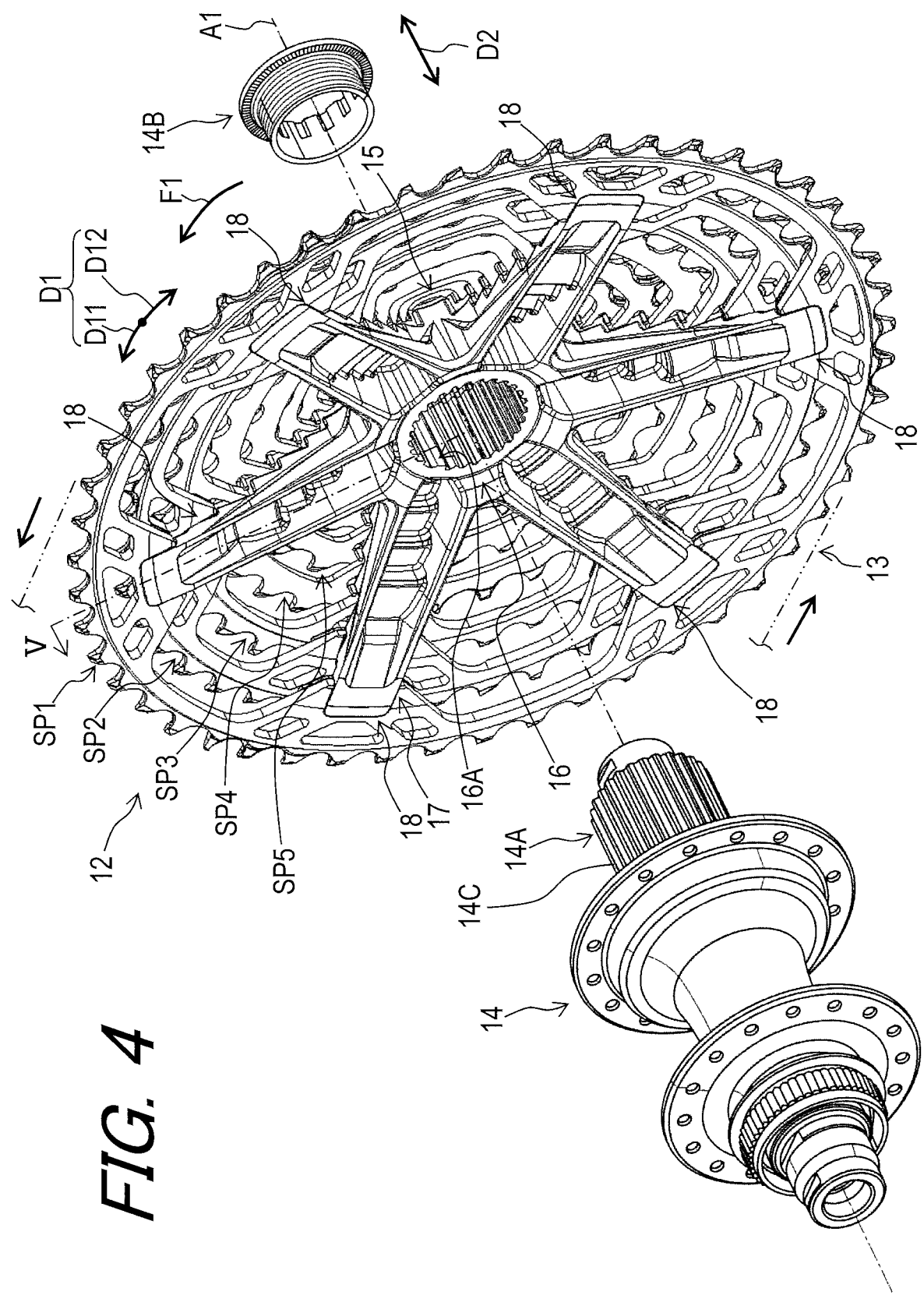
FIG. 4 is another perspective view of the bicycle rear sprocket assembly illustrated in FIG. 1, with the bicycle hub assembly and the lock ring.

As seen in FIG. 4, the bicycle rear sprocket assembly 12 further comprises a sprocket support 15 configured to engage with the bicycle hub assembly. The sprocket support 15 is configured to engage with the bicycle hub assembly 14. The bicycle rear sprocket assembly 12 further comprises a hub engagement part 16 configured to engage with the bicycle hub assembly. In this embodiment, the sprocket support 15 includes the hub engagement part 16 configured to engage with the bicycle hub assembly 14. However, the hub engagement part 16 can be omitted from the bicycle rear sprocket assembly 12 or can be provided at positions other than the sprocket support 15. The hub engagement part 16 includes an internal spline 16A. The sprocket support body 14A of the bicycle hub assembly 14 includes an external spline 14C. The internal spline 16A of the hub engagement part 16 is engageable with the external spline 14C of the sprocket support body 14A to transmit the driving rotational force F1 between the bicycle rear sprocket assembly 12 and the bicycle hub assembly 14. The sprocket support 15 includes a sprocket attachment part 17. The bicycle rear sprocket SP1 is attached to the sprocket attachment part 17. The sprocket attachment part 17 includes a plurality of support arms 18 extending radially outwardly from the hub engagement part 16. In this embodiment, the sprocket attachment part 17 includes six support arms 18. However, a total number of the support arms 18 is not limited to this embodiment.

Figure 5:
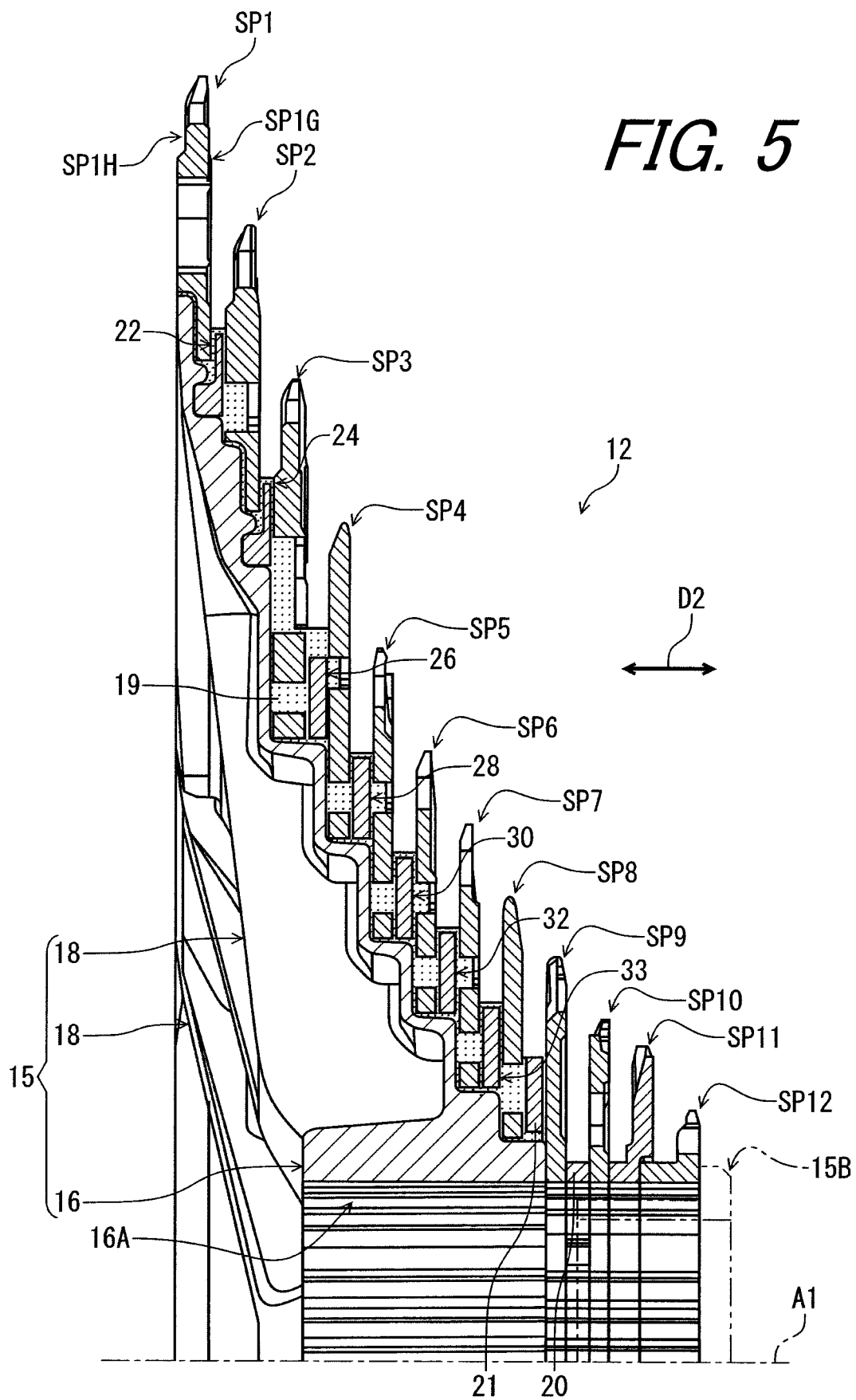
FIG. 5 is a cross-sectional view of the bicycle rear sprocket assembly taken along line V-V of FIG. 4.

As seen in FIG. 5, the bicycle rear sprockets SP1 to SP12 are arranged in this order in an axial direction D2 parallel to the rotational center axis A1. The bicycle rear sprocket SP1 is adjacent to the bicycle rear sprocket SP2 without another sprocket between the bicycle rear sprocket SP1 and the bicycle rear sprocket SP2 in the axial direction D2 with respect to the rotational center axis A1. The bicycle rear sprocket SP2 is adjacent to the bicycle rear sprocket SP3 without another sprocket between the bicycle rear sprocket SP2 and the bicycle rear sprocket SP3 in the axial direction D2 with respect to the rotational center axis A1. The bicycle rear sprocket SP3 is adjacent to the bicycle rear sprocket SP4 without another sprocket between the bicycle rear sprocket SP3 and the bicycle rear sprocket SP4 in the axial direction D2 with respect to the rotational center axis A1. The bicycle rear sprockets SP12 are arranged in the axial direction D2 in this order.

The bicycle rear sprocket SP1 and the bicycle rear sprocket SP2 are attached to the sprocket attachment part 17. The bicycle rear sprocket SP3 and the bicycle rear sprocket SP4 are attached to the sprocket attachment part 17. The bicycle rear sprocket SP1 and the bicycle rear sprocket SP2 are attached to the plurality of support arms 18. At least one of the bicycle rear sprockets SP5 to SP12 are attached to at least one of the hub engagement part 16 and the sprocket attachment part 17. In this embodiment, the bicycle rear sprockets SP3 to SP8 are attached to the plurality of support arms 18. The bicycle rear sprockets SP8 and SP9 are attached to the hub engagement part 16.

Figure 6:
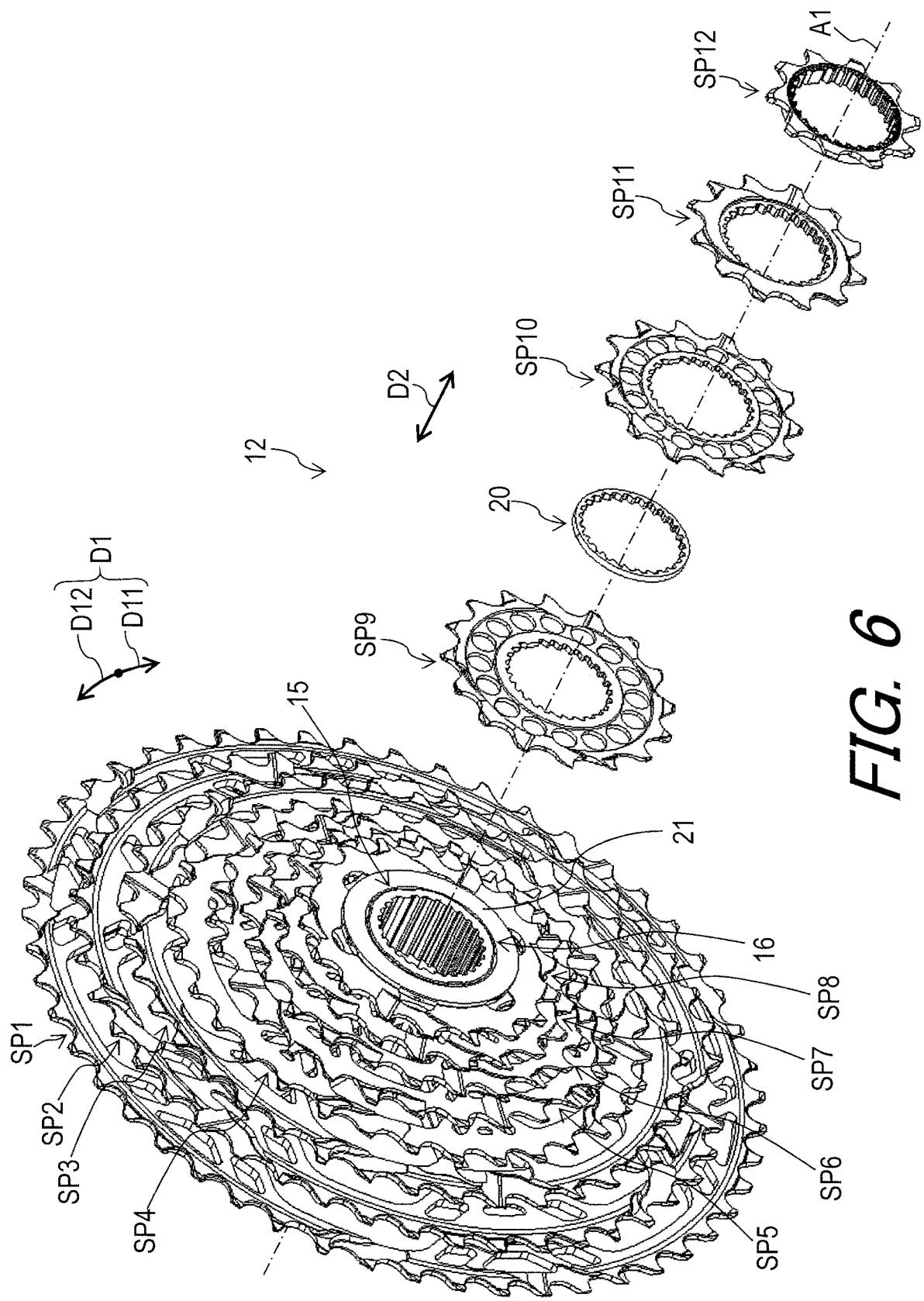
FIG. 6 is an exploded perspective view of the bicycle rear sprocket assembly illustrated in FIG. 2.

As seen in FIG. 6, the bicycle rear sprocket assembly 12 comprises an intermediate ring 20 and a ring cover 21. The intermediate ring 20 is provided between the bicycle rear sprocket SP9 and the bicycle rear sprocket SP10 in the axial direction D2. The ring cover 21 is provided between the bicycle rear sprocket SP8 and the bicycle rear sprocket SP9 in the axial direction D2. The bicycle rear sprockets SP1 to SP8 and the ring cover 21 are mounted on the sprocket support 15. The bicycle rear sprockets SP9 to SP12 and the intermediate ring 20 are not mounted on the sprocket support 15.

As seen in FIG. 5, the bicycle rear sprockets SP9 to SP12 and the intermediate ring 20 are held between the sprocket support 15 and the lock ring 14B in a state where the bicycle rear sprocket assembly 12 is mounted on the bicycle hub assembly 14 (FIG. 2). The bicycle rear sprockets SP9 to SP12 and the intermediate ring 20 are not attached to each other. However, at least one of the bicycle rear sprockets SP9 to SP12 and the intermediate ring 20 can be attached to an adjacent member.

The bicycle rear sprockets SP1 to SP8 are attached to the sprocket support 15 in this embodiment. The ring cover 21 is attached to at least one of the sprocket support 15 and the bicycle rear sprocket SP8. For example, the bicycle rear sprockets SP1 to SP8 are attached to the sprocket support 15 with a bonding structure such as adhesive without a metallic fastener. For example, the bicycle rear sprocket assembly 12 comprises an adhesive 19. This structure saves weight of the bicycle rear sprocket assembly 12. However, at least one of the bicycle rear sprockets SP1 to SP12 can be attached to the sprocket support 15 with a metallic fastener.

In this embodiment, the bicycle rear sprockets SP1 to SP12, the intermediate ring 20, and the ring cover 21 are separate members from each other. However, at least one of the bicycle rear sprockets SP1 to SP12, the intermediate ring 20, and the ring cover 21 can be integrally provided with another of the bicycle rear sprockets SP1 to SP12, the intermediate ring 20, and the ring cover 21 as a one-piece unitary member.

The bicycle rear sprocket SP1 is made of a first metallic material. Each of the bicycle rear sprockets SP2 to SP12 is made of the first metallic material. The first metallic material includes aluminum. However, the first metallic material can include another metallic material such as iron, titanium, and stainless steel. At least one of the bicycle rear sprockets SP1 to SP12 can include a non-metallic material. The sprocket support 15 is made of a material including a non-metallic material such as a resin material, fiber-reinforced-plastic and carbon-fiber-reinforced-plastic. However, the material of the sprocket support 15 can include a metallic material such as iron, aluminum, titanium, and stainless steel.

As seen in FIG. 5, the bicycle rear sprocket SP1 has an outward facing side SP and an inward facing side SP1H. The outward facing side SP1G faces in the axial direction D2 parallel to the rotational center axis A1. The inward facing side SP1H faces in the axial direction D2. The inward facing side SP1H is opposite to the outward facing side SP in the axial direction D2. The outward facing side SP faces toward the bicycle rear sprocket SP2 in the axial direction D2.

Figure 7:
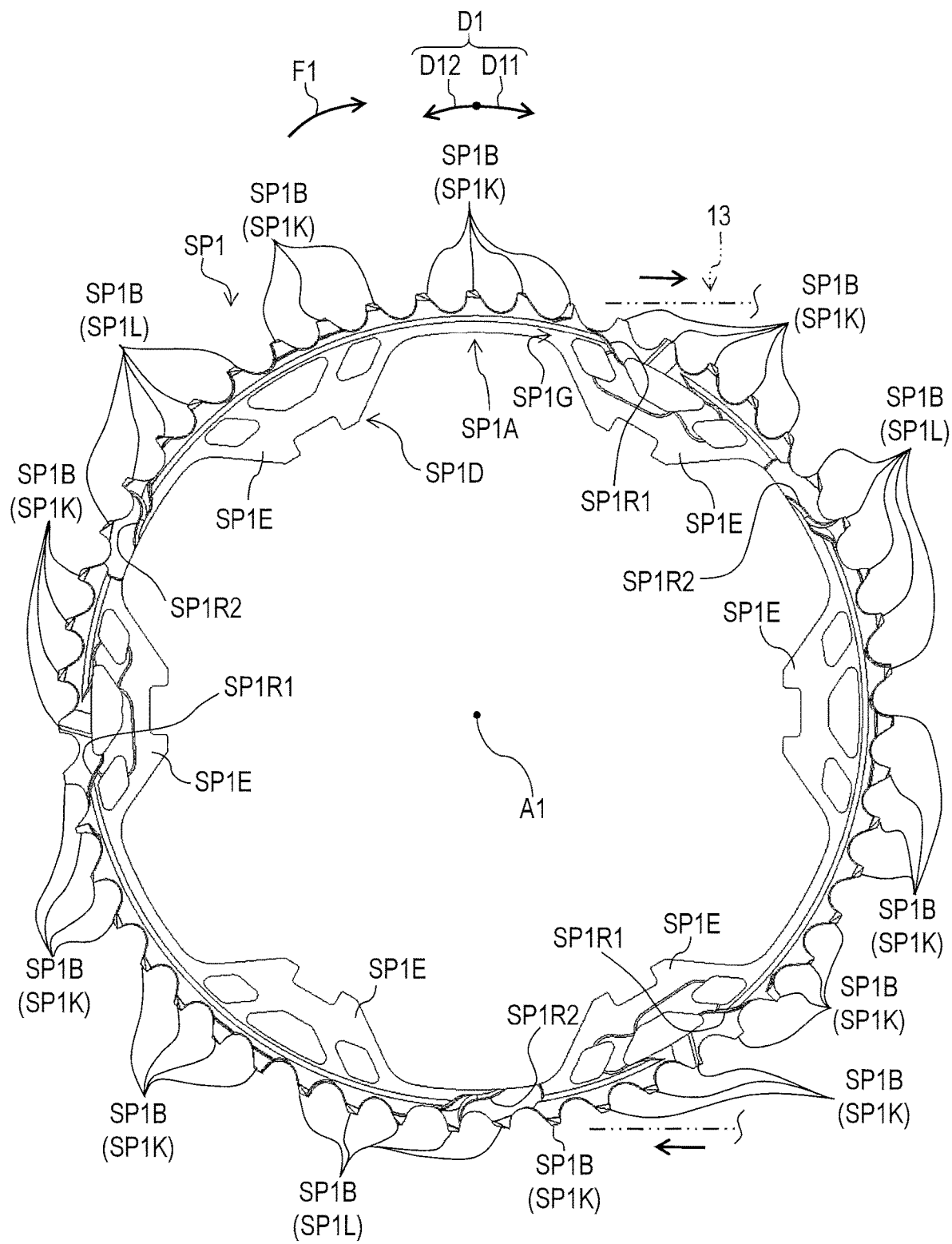
FIG. 7 is a side elevational view of a bicycle rear sprocket of the bicycle rear sprocket assembly illustrated in FIG. 2.

As seen in FIG. 7, the bicycle rear sprocket SP1 has the rotational center axis A1. The bicycle rear sprocket SP1 is configured to engage with the bicycle chain 13. The bicycle rear sprocket SP1 comprises a sprocket body SP1A and a plurality of sprocket teeth SP1B. The sprocket body SP1A is rotatable about the rotational center axis A1. The plurality of sprocket teeth SP1B extends radially outward from the sprocket body SP1A with respect to the rotational center axis A1 of the bicycle rear sprocket SP1.

The sprocket body SP1A includes a support attachment part SP1D attached to the sprocket support 15 (FIG. 5). The support attachment part SP1D includes a plurality of attachment portions SP1E attached to the plurality of support arms 18 (FIG. 5). A total number of the first attachment portions SP1E is equal to the total number of the support arms 18 (FIG. 5). However, the total number of the attachment portions SP1E is not limited to this embodiment. At least one of the attachment portions SP1E can be omitted from the bicycle rear sprocket SP1.

The bicycle rear sprocket SP1 further comprises an axially inward recess SP1R1 provided on the outward facing side SP to facilitate an inward shifting operation in which the bicycle chain 13 is shifted from the smaller sprocket SP2 to the bicycle rear sprocket SP1. The sprocket body SP1A includes an axially outward recess SP1R2 provided on the outward facing side SP to facilitate an outward shifting operation in which the bicycle chain 13 is shifted from the bicycle rear sprocket SP1 to the smaller sprocket SP2 (FIG. 5).

In this embodiment, the bicycle rear sprocket SP1 comprises a plurality of axially inward recesses SP1R1 provided on the outward facing side SP1G to facilitate the inward shifting operation. The bicycle rear sprocket SP1 comprises a plurality of axially outward recesses SP1R2 provided on the outward facing side SP1G to facilitate the outward shifting operation. However, a total number of the axially inward recesses SP1R1 is not limited to this embodiment. A total number of the axially outward recesses SP1R2 is not limited to this embodiment.

The bicycle rear sprockets SP2 to SP12 have substantially the same structures as that of the bicycle rear sprocket SP1. Thus, they will not be described in detail here for the sake of brevity.

Figure 8:
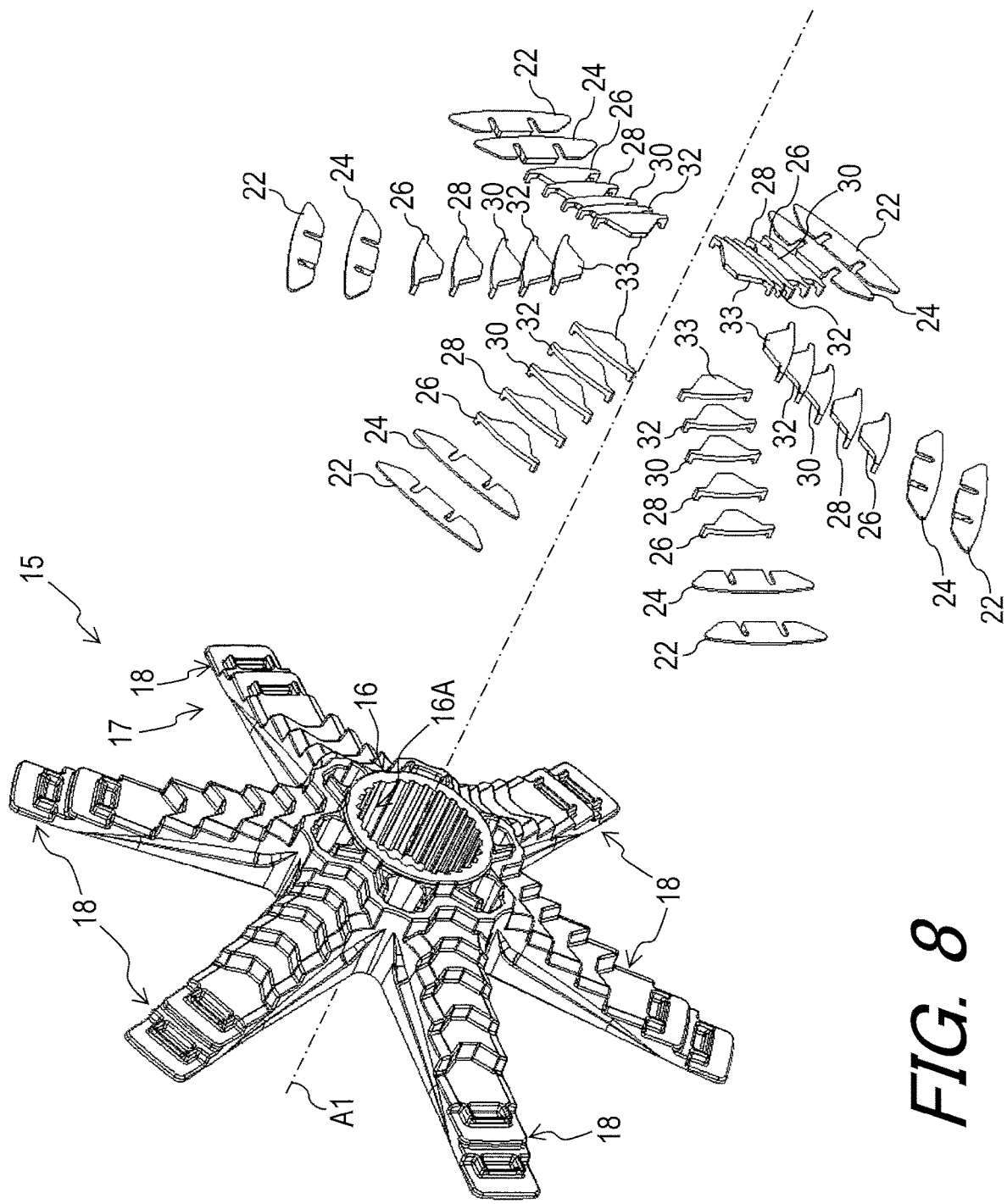
FIG. 8 is a perspective view of a sprocket support and a plurality of spacers of the bicycle rear sprocket assembly illustrated in FIG. 2.
Figure 9:
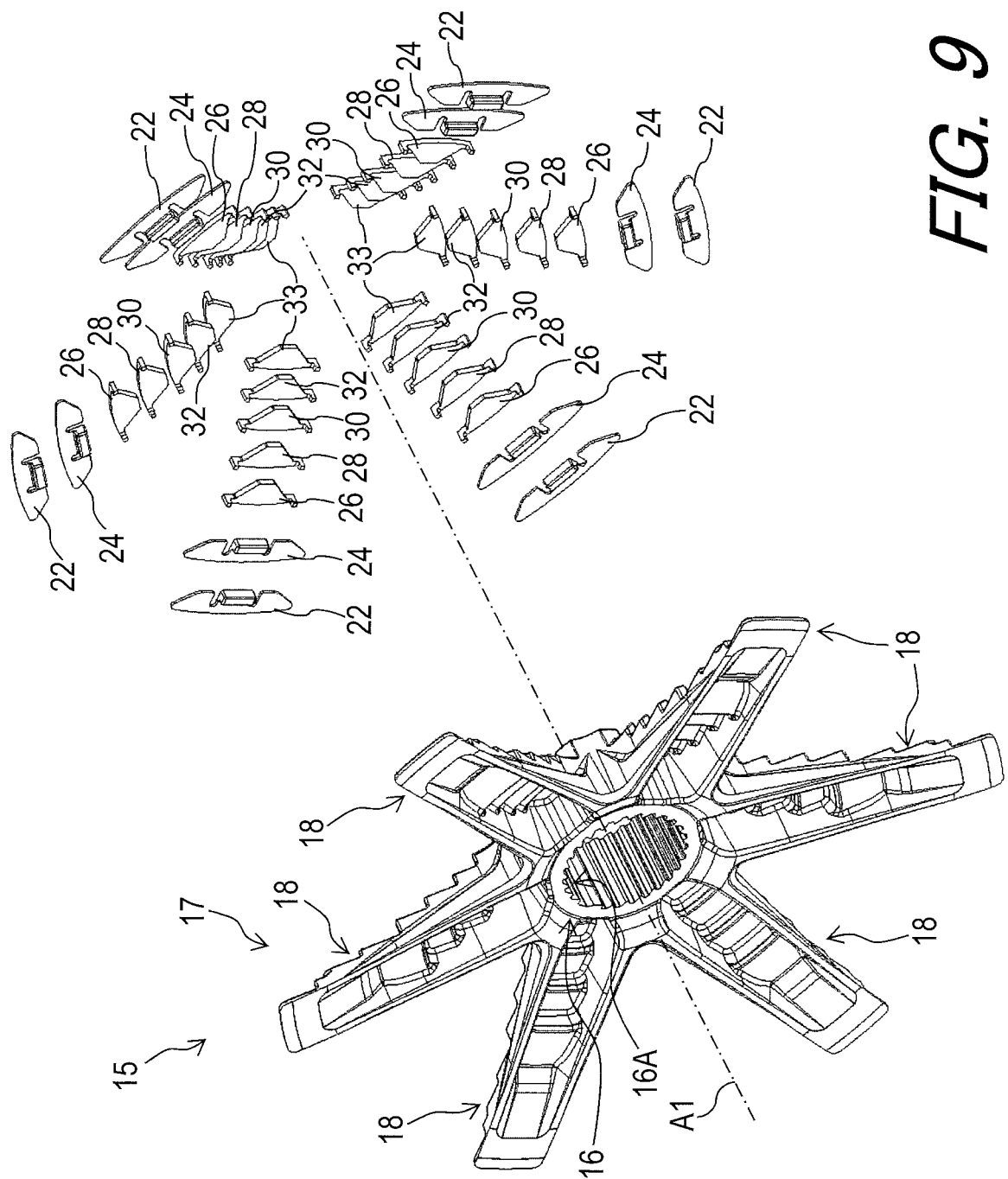
FIG. 9 is another perspective view of the sprocket support and the plurality of spacers of the bicycle rear sprocket assembly illustrated in FIG. 2.

As seen in FIGS. 8 and 9, the bicycle rear sprocket assembly 12 comprises a plurality of first spacers 22, a plurality of second spacers 24, a plurality of third spacers 26, a plurality of fourth spacers 28, a plurality of fifth spacers 30, a plurality of sixth spacers 32, and a plurality of seventh spacers 33. Each of the first to seventh spacers 22 to 33 is made of a non-metallic material such as a resin material. However, the first to seventh spacers 22 to 33 can be made of a metallic material.

A total number of the first spacers 22 is equal to the total number of the support arms 18. A total number of the second spacers 24 is equal to the total number of the support arms 18. A total number of the third spacers 26 is equal to the total number of the support arms 18. A total number of the fourth spacers 28 is equal to the total number of the support arms 18. A total number of the fifth spacers 30 is equal to the total number of the support arms 18. A total number of the sixth spacers 32 is equal to the total number of the support arms 18. A total number of the seventh spacers 33 is equal to the total number of the support arms 18. However, the total number of the first spacers 22 is not limited to this embodiment. The total number of the second spacers 24 is not limited to this embodiment. The total number of the third spacers 26 is not limited to this embodiment. The total number of the fourth spacers 28 is not limited to this embodiment. The total number of the fifth spacers 30 is not limited to this embodiment. The total number of the sixth spacers 32 is not limited to this embodiment. The total number of the seventh spacers 33 is not limited to this embodiment.

Figure 10:
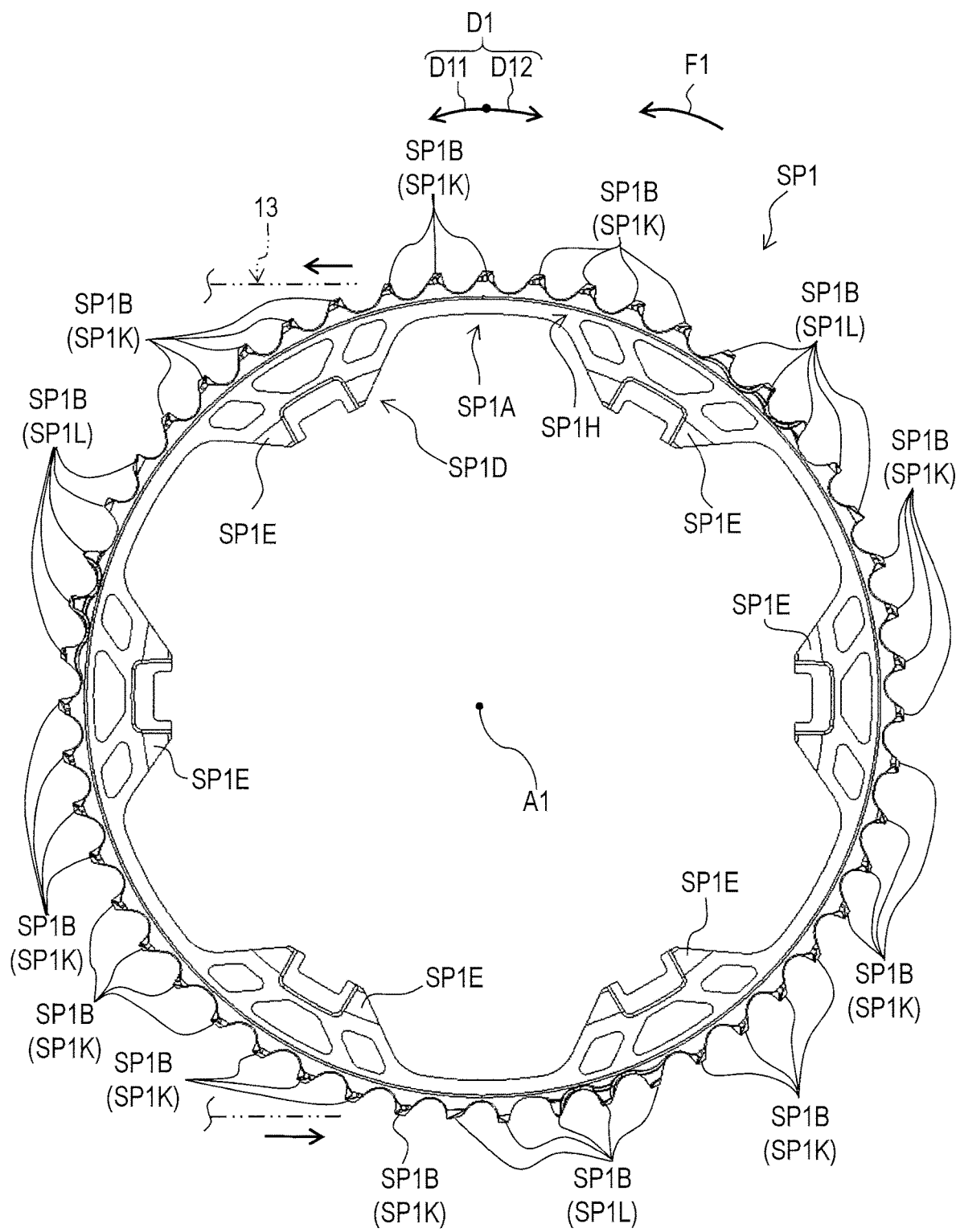
FIG. 10 is another side elevational view of the bicycle rear sprocket illustrated in FIG. 7.
Figure 11:
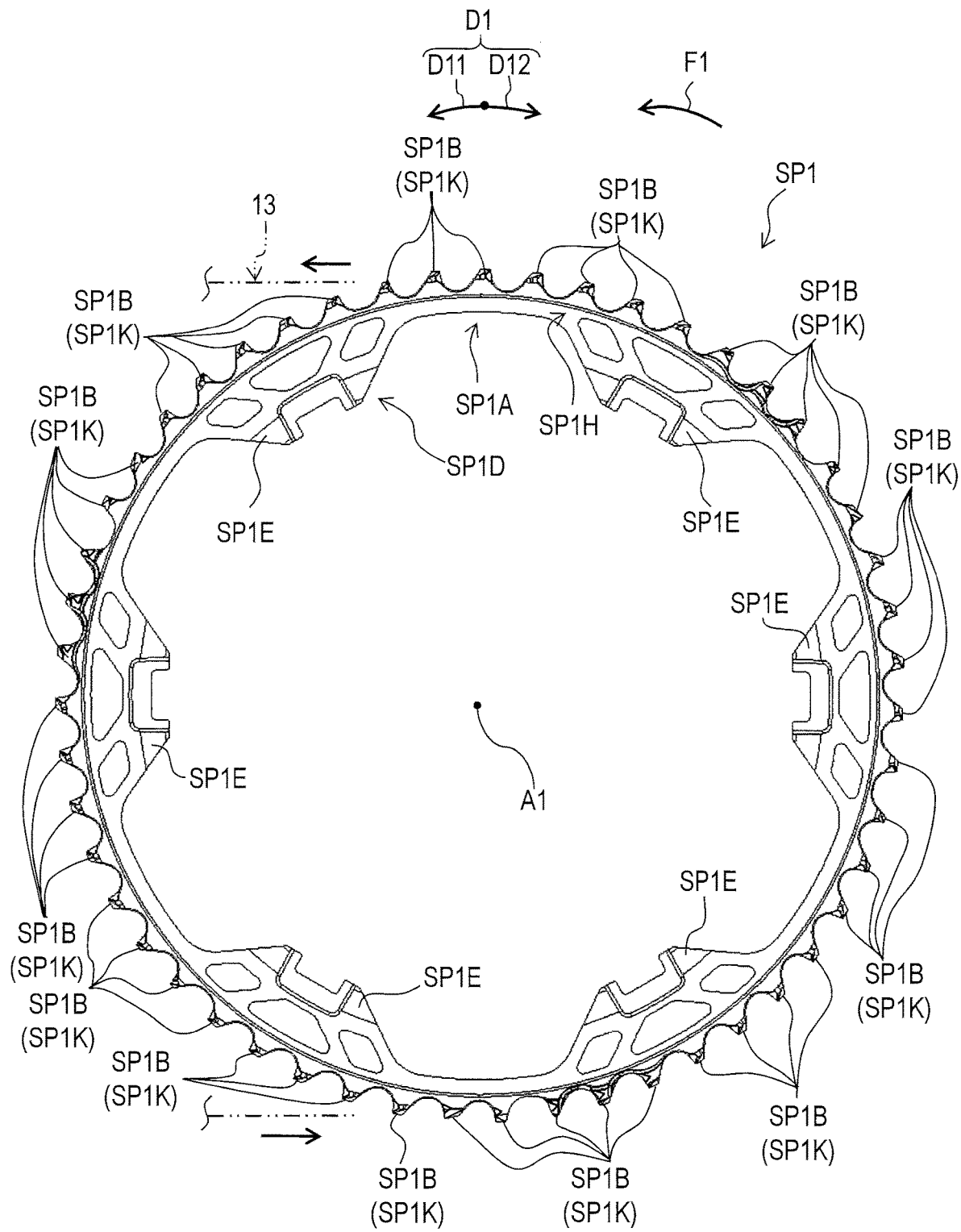
FIG. 11 is another side elevational view of a bicycle rear sprocket in accordance with a modification of the embodiment.

As seen in FIG. 10, the plurality of sprocket teeth SP1B includes a plurality of first teeth SP1K. The plurality of first teeth SP1K accounts for at least 25% of the plurality of sprocket teeth SP1B. The plurality of sprocket teeth SP1B includes at least 28 sprocket teeth. In this embodiment, a total number of the sprocket teeth SP1B is 51. A total number of the first teeth SP1K is 36. The plurality of first teeth SP1K accounts for approximately 70.6% of the plurality of sprocket teeth SP1B. However, the percentage of the plurality of first teeth SP1K is not limited to this embodiment. As seen in FIG. 11, for example, the plurality of first teeth SP1K can account for all teeth of the plurality of sprocket teeth SP1B.

The plurality of sprocket teeth SP1B includes a plurality of second teeth SP1L. A total number of the second teeth SP1L is 15. The plurality of first teeth SP1K accounts for approximately 29.4% of the plurality of sprocket teeth SP1B. However, the percentage of the plurality of second teeth SP1L is not limited to this embodiment. At least one of the second teeth SP1L can be omitted from the bicycle rear sprocket SP1.

In this embodiment, the plurality of first teeth SP1K is a plurality of driving teeth to receive the driving rotational force F1 from the bicycle chain 13 during pedaling. The plurality of second teeth SP1L is a plurality of additional driving teeth to receive the driving rotational force F1 from the bicycle chain 13 during pedaling. However, at least one of the first teeth SP1K and the second teeth SP1L can be a non-driving tooth to not receive the driving rotational force F1 from the bicycle chain 13 during pedaling.

Figure 12:
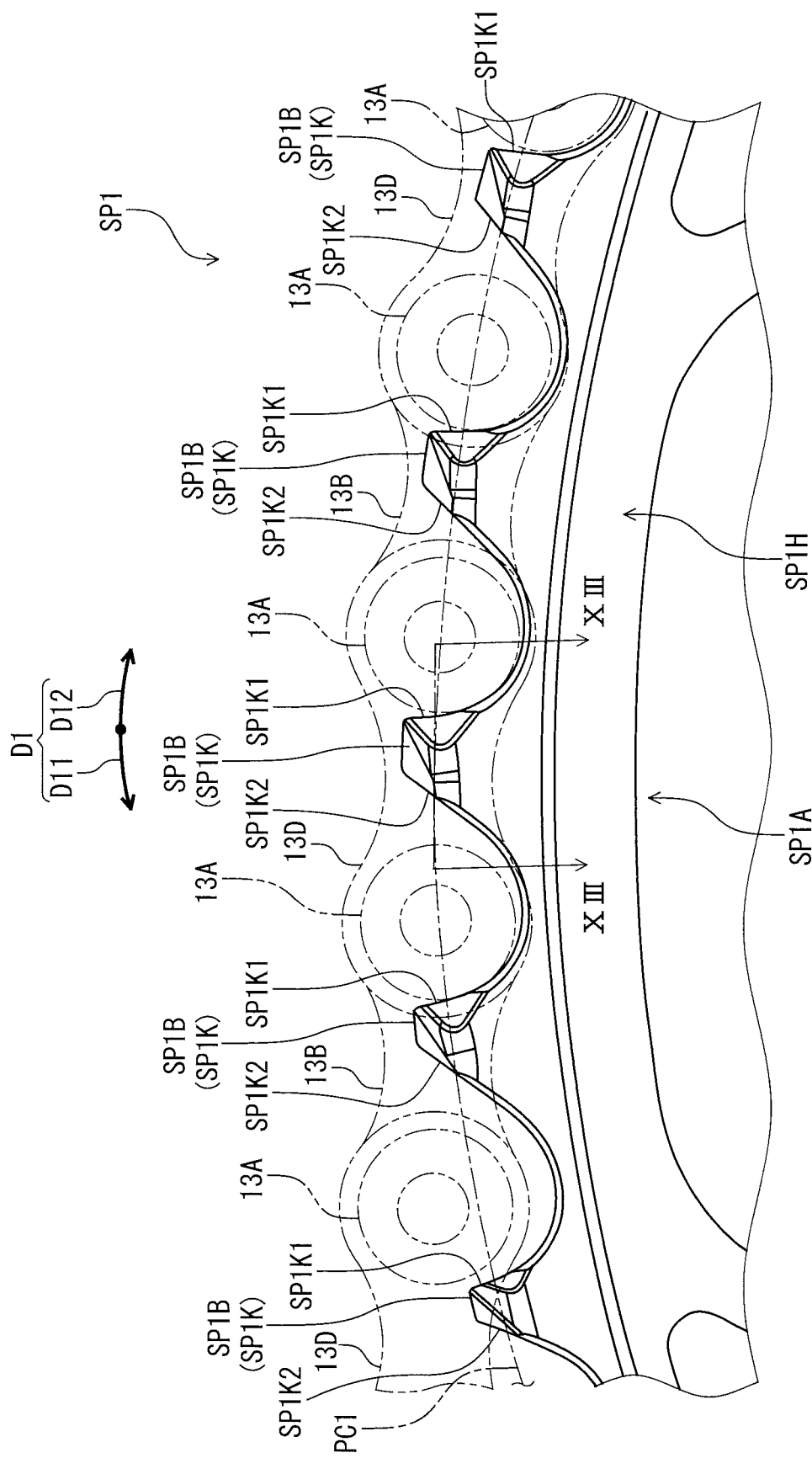
FIG. 12 is a partial enlarged side elevational view of the bicycle rear sprocket illustrated in FIG. 10, with a bicycle chain.

As seen in FIG. 12, each tooth of the plurality of first teeth SP1K has a driving surface SP1K1 and a non-driving surface SP1K2. The non-driving surface SP1K2 is provided on a reverse side of the driving surface SP1K1 in the circumferential direction D1 with respect to the rotational center axis A1. The driving surface SP1K1 is contactable with a roller 13A of the bicycle chain 13 to receive the driving rotational force F1 from the bicycle chain 13 during pedaling. The non-driving surface SP1K2 is provided on the reverse side of the driving surface SP1K1 to not receive the driving rotational force F1 from the bicycle chain 13 during pedaling.

Figure 13:
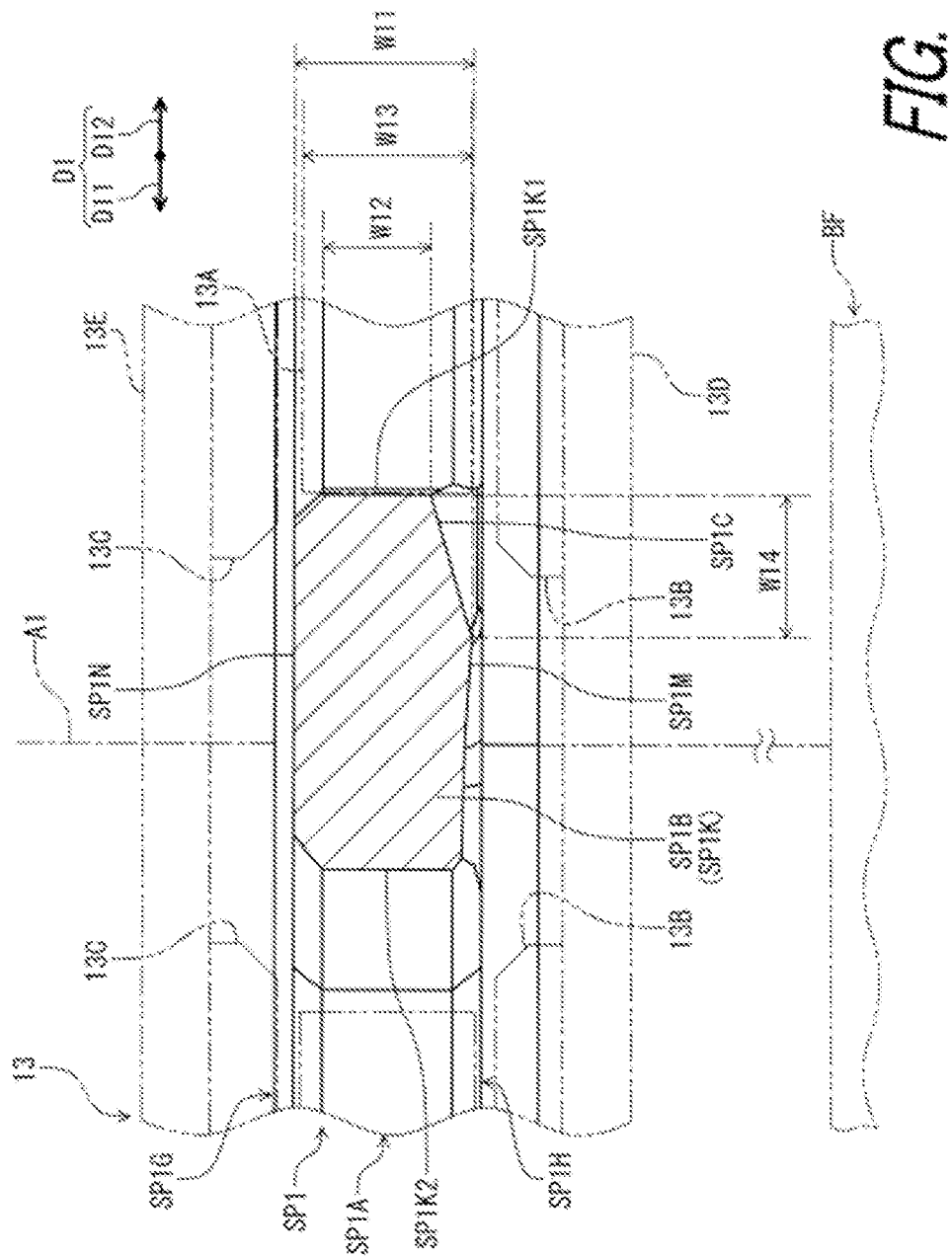
FIG. 13 is a cross-sectional view of the bicycle rear sprocket assembly taken along line XIII-XIII of FIG. 12.

As seen in FIG. 13, each tooth of the plurality of first teeth SP1K has an axial maximum tooth-width W11 and an axial driving-surface tooth-width W12. The axial maximum tooth-width W11 is defined in the axial direction D2 of the rotational center axis A1 as a maximum width in each tooth of the plurality of first teeth SP1K. The axial maximum tooth-width W11 is defined on the pitch circle PC1 of the bicycle rear sprocket SP1 (FIG. 12). The axial driving-surface tooth-width W12 is defined in the axial direction D2 on the driving surface SP1K1. Each tooth of the plurality of first teeth SP1K has the axial maximum tooth-width W11 in an area defined to overlap with an inner link plate 13B (FIG. 12) of the bicycle chain 13 configured to engage with the bicycle rear sprocket SP1 when viewed in the axial direction D2.

In this embodiment, the axial driving-surface tooth-width W12 is smaller than the axial maximum tooth-width W11. The axial maximum tooth-width W11 is larger than 1.6 mm. The axial maximum tooth-width W11 is larger than 1.9 mm. However, the axial driving-surface tooth-width W12 is not limited to this embodiment and the above ranges.

The axial maximum tooth-width W11 is larger than a width W13 of the roller 13A of the bicycle chain 13 configured to engage with the bicycle rear sprocket SP1. The axial driving-surface tooth-width W12 is smaller than the width W13 of the roller 13A, However, the relationship among the axial maximum tooth-width W11, the width W13 of the roller 13A, and the axial driving-surface tooth-width W12 is not limited to this embodiment.

Figure 14:
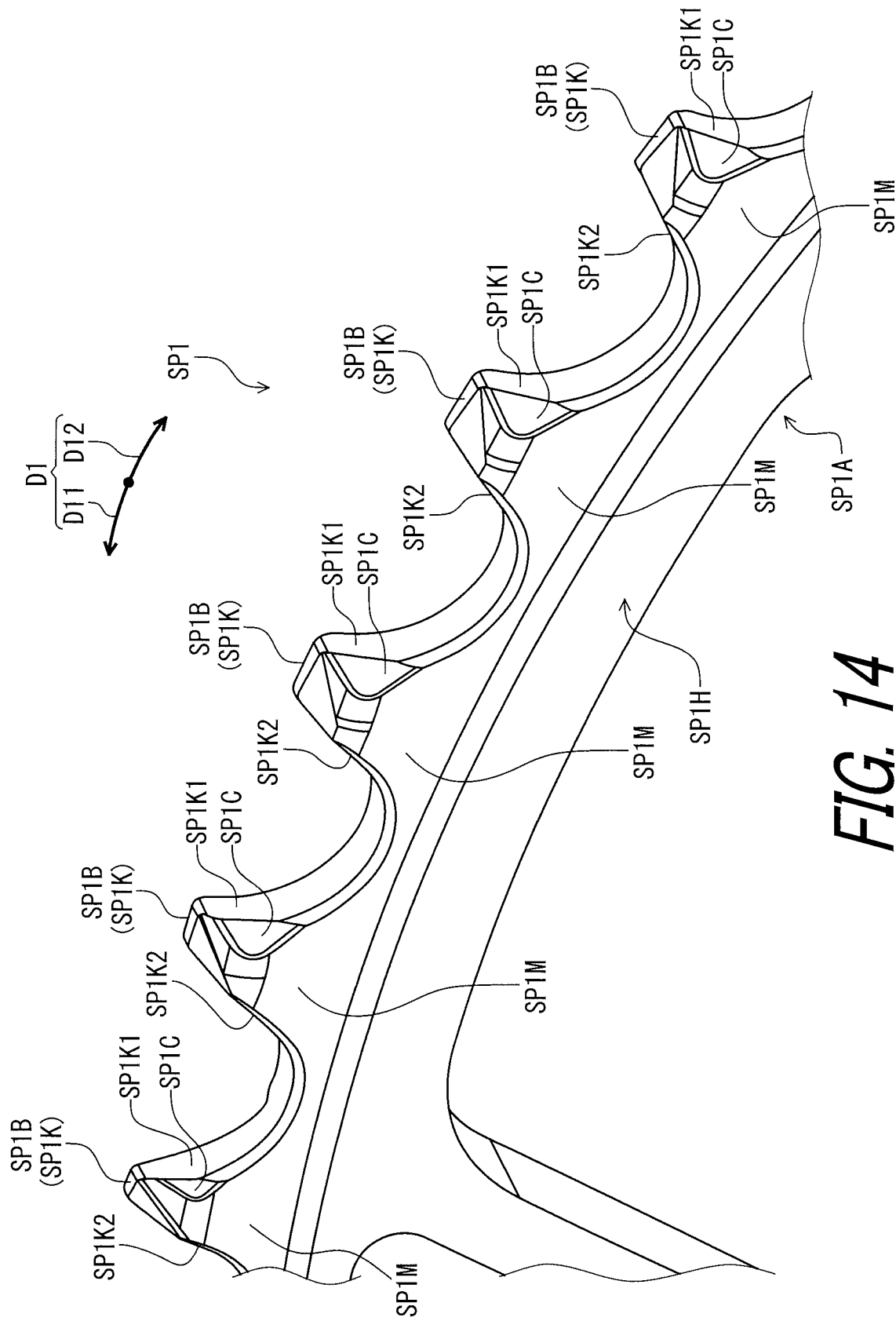
FIG. 14 is a perspective view of the bicycle rear sprocket illustrated in FIG. 10.
Figure 15:
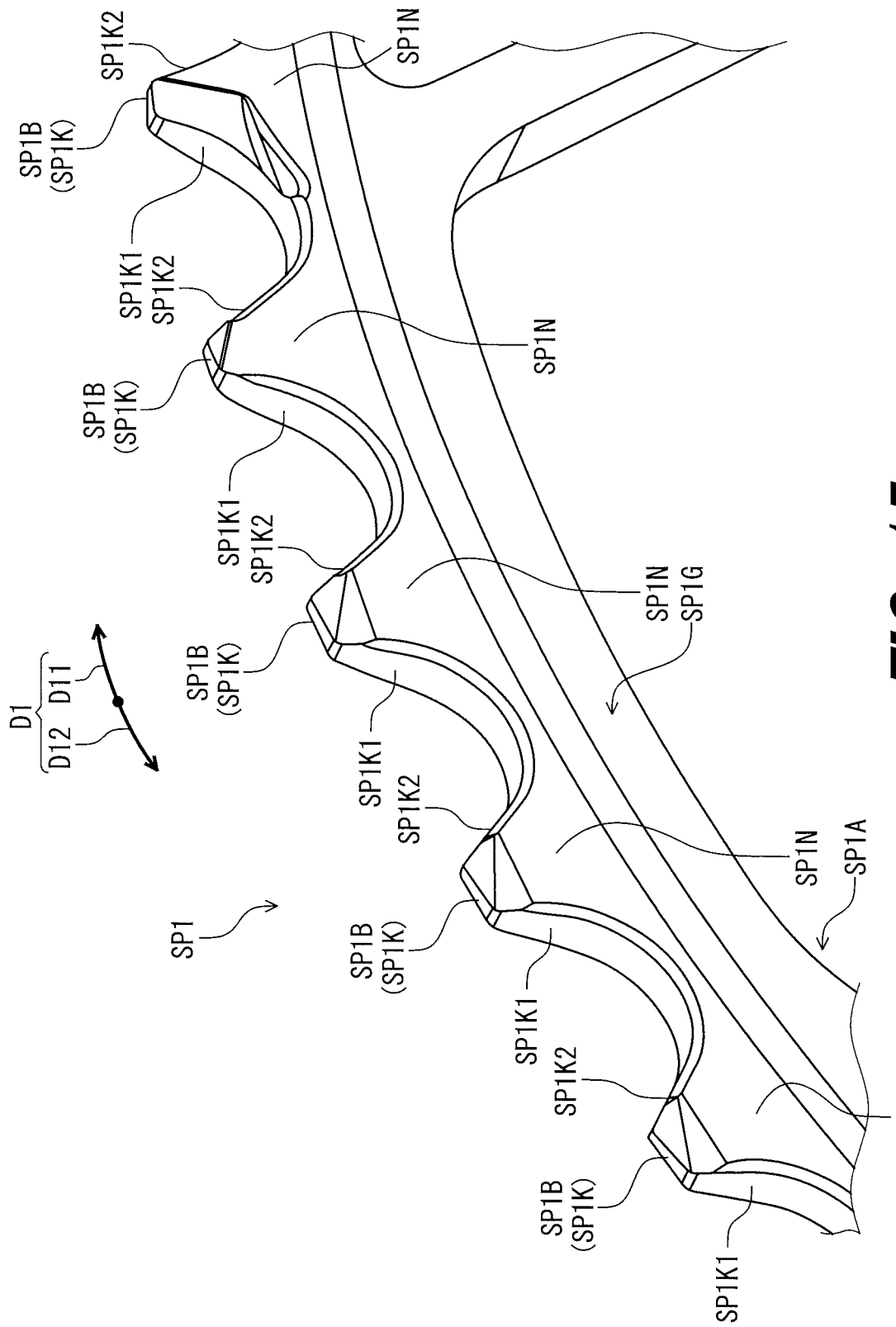
FIG. 15 is another perspective view of the bicycle rear sprocket illustrated in FIG. 10.

As seen in FIGS. 14 and 15, each tooth of the plurality of first teeth SP1K includes a first axial surface SP1M, a first additional axial surface SP1N, and a chamfer SP1C. The first axial surface SP1M faces in the axial direction D2. As seen in FIG. 13, the first additional axial surface SP1N faces in the axial direction D2. The first additional axial surface SP1N is provided on a reverse side of the first axial surface SP1M in the axial direction D2. The axial maximum tooth-width W11 is defined between the first axial surface SP1M and the first additional axial surface SP1N in the axial direction D2. The chamfer SP1C is closer to the first axial surface SP1M than the first additional axial surface SP1N. The axial driving-surface tooth-width W12 is defined between the chamfer SP1C and the first additional axial surface SP1N on the driving surface. As seen in FIG. 14, the chamfer SP1C is provided between the first axial surface SP1M and the driving surface SP1K1. However, the position of the chamfer SP1C is not limited to this embodiment.

In this embodiment, as seen in FIG. 13, the first axial surface SP1M is provided between the first additional axial surface SP1N and the bicycle frame BF in the axial direction D2 in a state where the bicycle rear sprocket SP1 is mounted to the bicycle frame BF. The first axial surface SP1M is contactable with the bicycle chain 13 and is provided on the inward facing side SP1H. The first additional axial surface SP1N is contactable with the bicycle chain 13 and is provided on the outward facing side SP1G.

Figure 16:
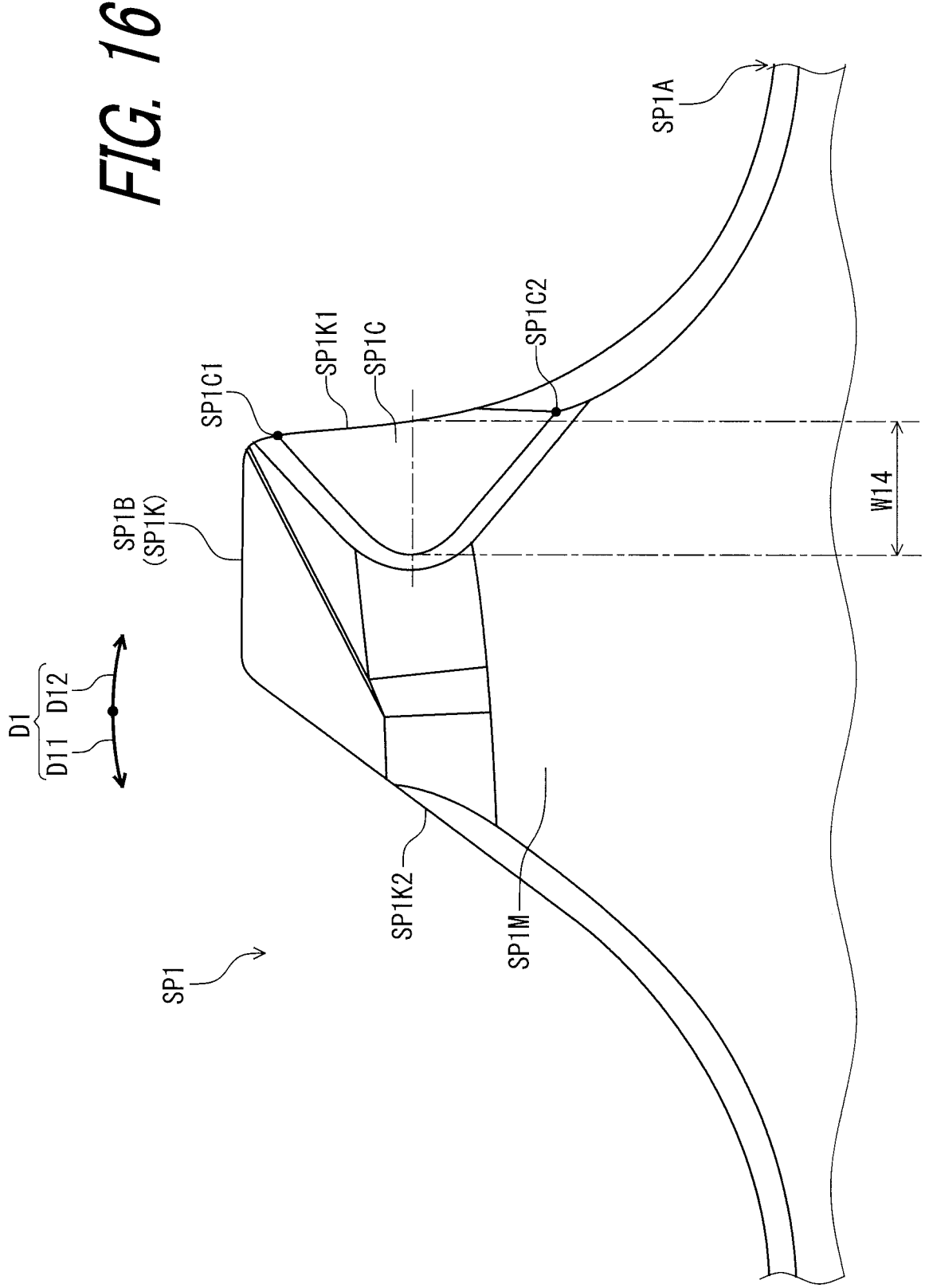
FIG. 16 is a partial enlarged side elevational view of the bicycle rear sprocket illustrated in FIG. 10.

As seen in FIG. 16, the chamfer SP1C has a maximum circumferential width W14 defined in the circumferential direction D1. The chamfer SP includes a radially outer end SP and a radially inner end SP1C2. The maximum circumferential width W14 is defined at a radial position provided between the radially outer end SP1C1 and the radially inner end SP1C2. However, the position of the maximum circumferential width W14 is not limited to this embodiment.

As seen in FIG. 13, in this embodiment, the maximum circumferential width W14 is larger than the axial driving-surface tooth-width W12. The maximum circumferential width W14 is smaller than the axial maximum tooth-width W11. However, the relationship among the axial maximum tooth-width W11, the axial driving-surface tooth-width W12, and the maximum circumferential width W14 is not limited to this embodiment.

Figure 17:
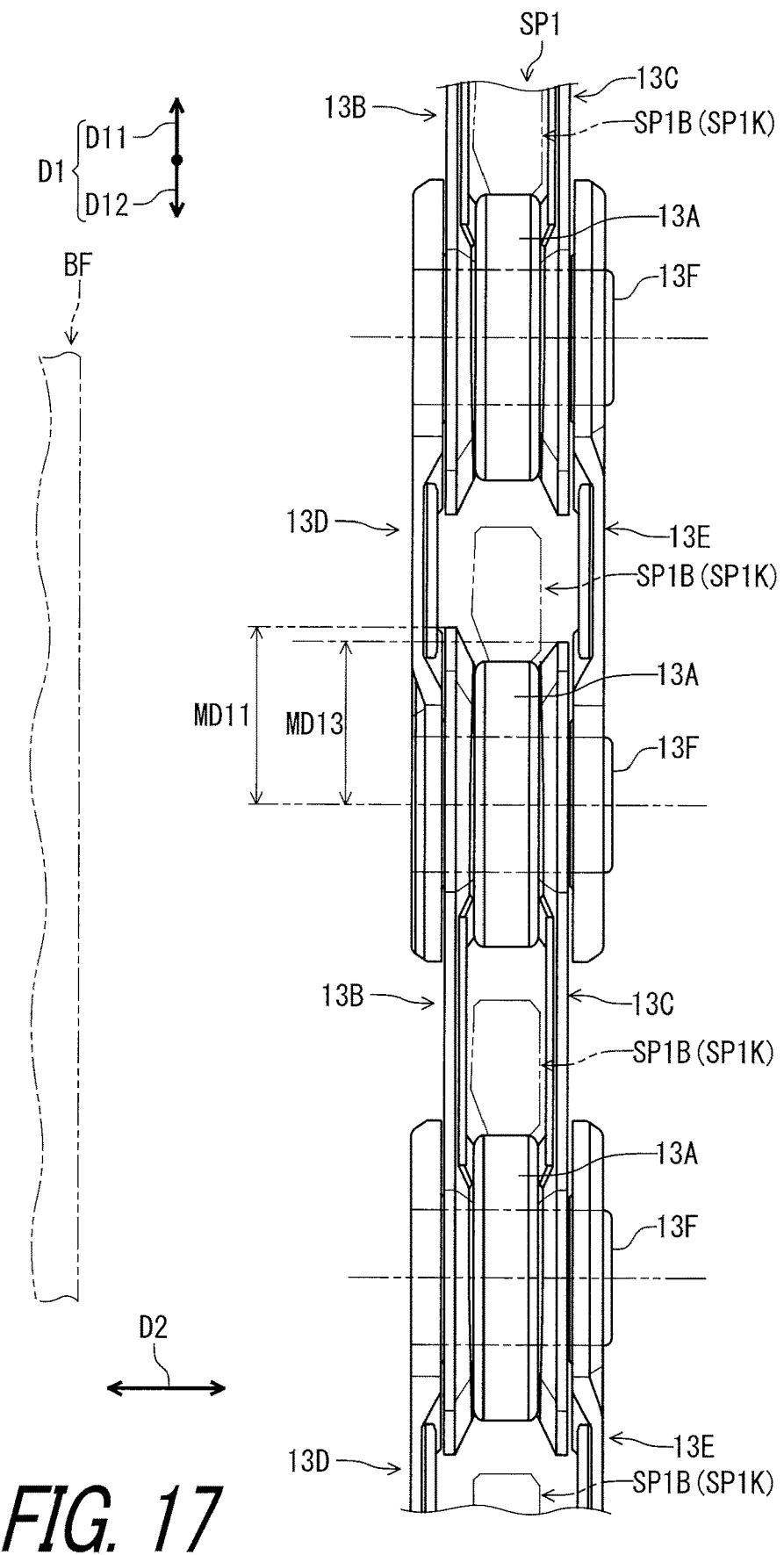
FIG. 17 is a plan view of the bicycle chain with the bicycle rear sprocket illustrated in FIG. 10.

As seen in FIG. 17, the bicycle chain 13 includes the inner link plate 13B, an additional inner link plate 13C, an outer link plate 13D, and an additional outer link plate 13E. In this embodiment, the bicycle chain 13 includes a plurality of inner link plates 13B, a plurality of additional inner link plates 13C, a plurality of outer link plates 13D, and a plurality of additional outer link plates 13E. The bicycle chain 13 includes a plurality of rollers 13A and a plurality of link pins 13F.

Figure 18:
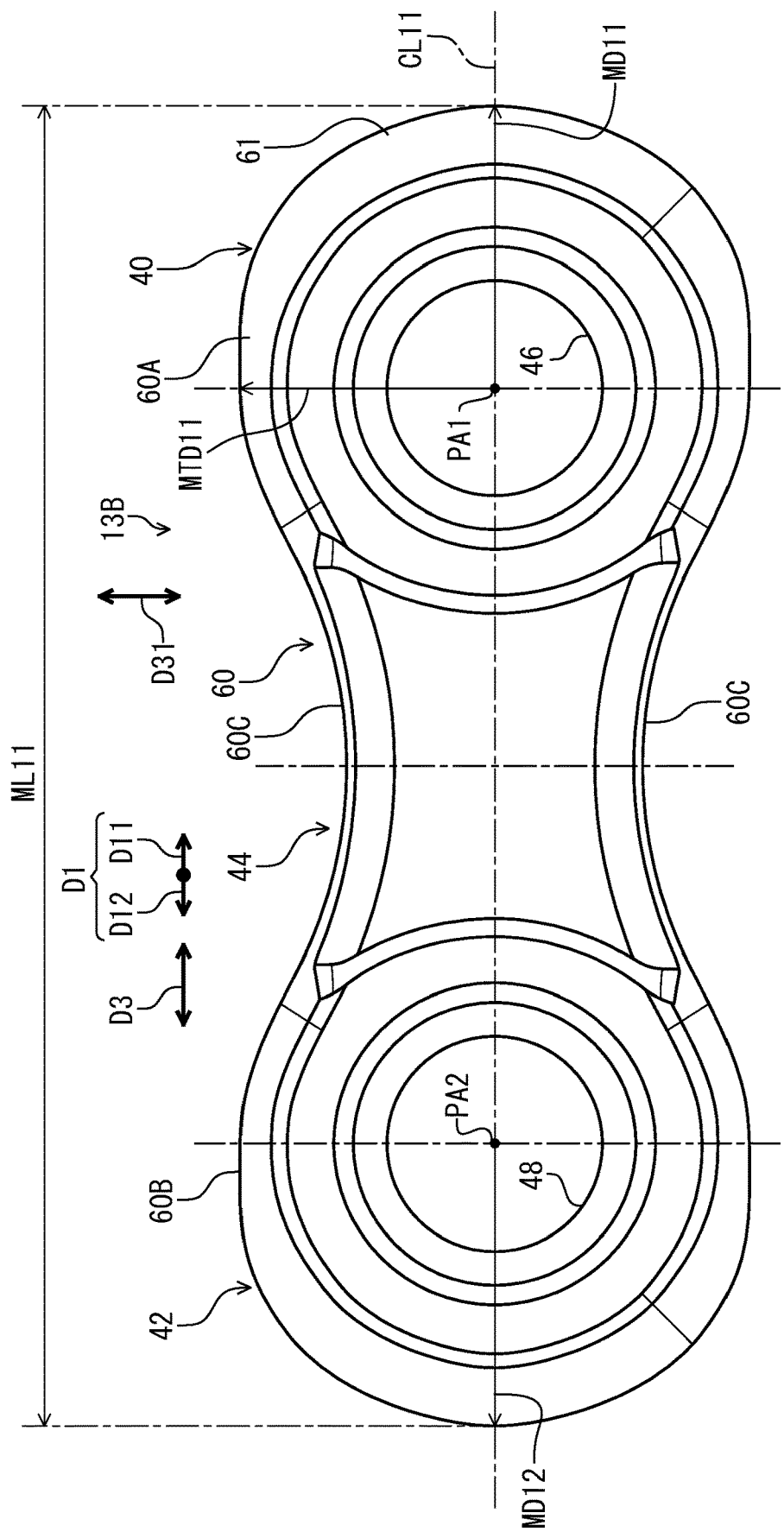
FIG. 18 is a side elevational view of an inner link plate of the bicycle chain illustrated in FIG. 17.

As seen in FIG. 18, the inner link plate 13B has a longitudinal centerline CL11 defining a longitudinal direction D3. The inner link plate 13B comprises a first inner-link end portion 40, a second inner-link end portion 42, and a first inner-link intermediate portion 44. The first inner-link end portion 40 includes a first inner-link opening 46 having a first inner-link center axis PA1. The second inner-link end portion 42 includes a second inner-link opening 48 having a second inner-link center axis PA2 extending along the first inner-link center axis PA1. The first inner-link intermediate portion 44 interconnects the first inner-link end portion 40 and the second inner-link end portion 42.

In this embodiment, the longitudinal centerline CL11 is provided on the first inner-link center axis PA1 and the second inner-link center axis PA2 when viewed along the first inner-link center axis PA1. The second inner-link center axis PA2 is parallel to the first inner-link center axis PA1. However, the second inner-link center axis PA2 can be non-parallel to the first inner-link center axis PA1.

Figure 19:
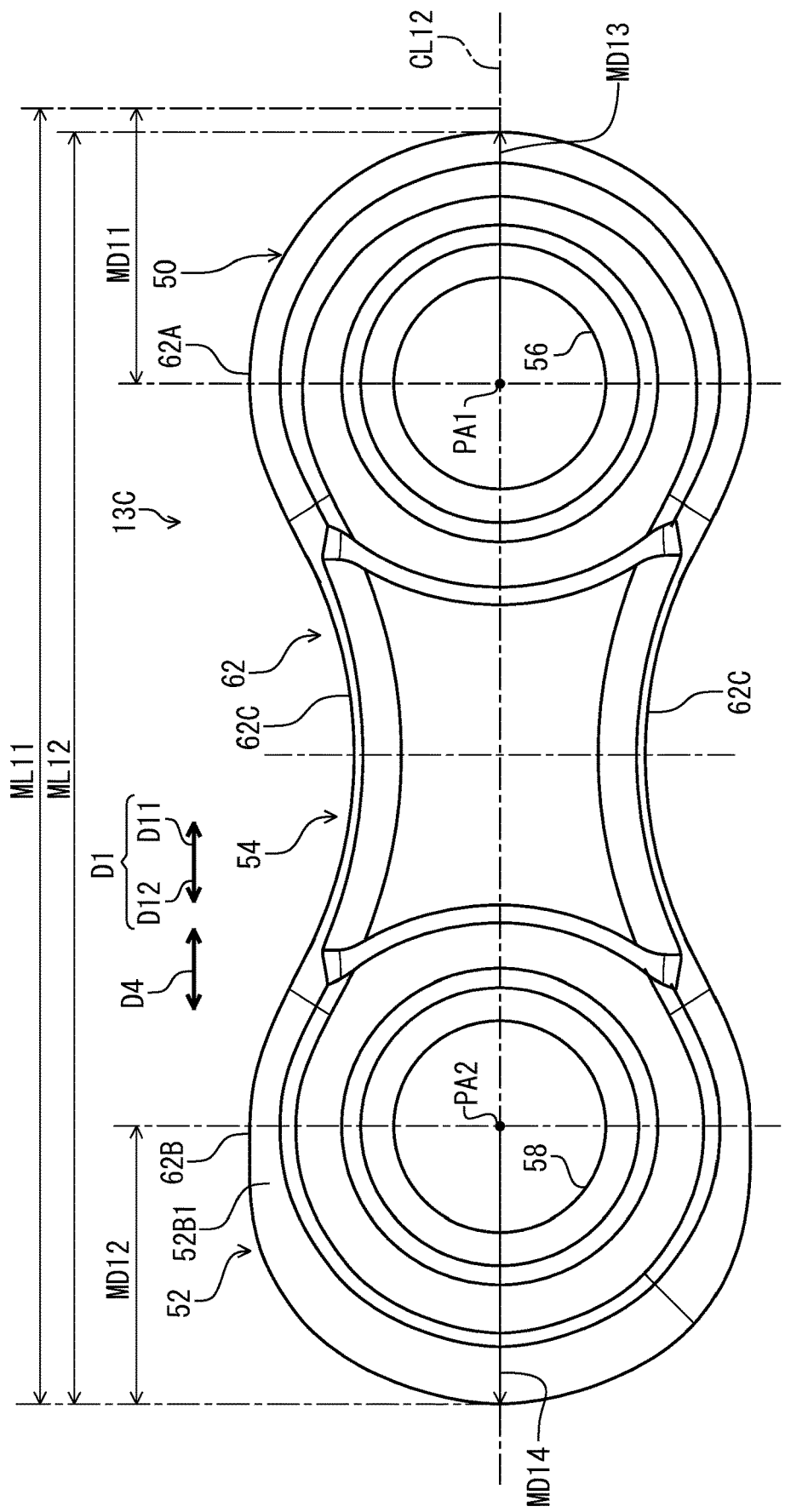
FIG. 19 is a side elevational view of an additional inner link plate of the bicycle chain illustrated in FIG. 17.

As seen in FIG. 19, the additional inner link plate 13C has an additional longitudinal centerline CL12 defining an additional longitudinal direction D4. The additional inner link plate 13C comprises a third inner-link end portion 50, a fourth inner-link end portion 52, and a second inner-link intermediate portion 54. The third inner-link end portion 50 includes a third inner-link opening 56 having a third inner-link center axis PA3. The fourth inner-link end portion 52 includes a fourth inner-link opening 58 having a fourth inner-link center axis PA4 extending along the third inner-link center axis PA3. The second inner-link intermediate portion 54 interconnects the third inner-link end portion 50 and the fourth inner-link end portion 52.

In this embodiment, the additional longitudinal centerline CL12 is provided on the third inner-link center axis PA3 and the fourth inner-link center axis PA4 when viewed along the third inner-link center axis PA3. The fourth inner-link center axis PA4 is parallel to the third inner-link center axis PA3. However, the fourth inner-link center axis PA4 can be non-parallel to the third inner-link center axis PA3.

As seen in FIG. 18, the first inner-link end portion 40, the second inner-link end portion 42 and the first inner-link intermediate portion 44 define a first inner-link outer peripheral edge 60. The first inner-link outer peripheral edge 60 comprises a first inner-link end edge 60A, a second inner-link end edge 60B, and a pair of first inner-link intermediate edges 60C. The first inner-link end edge 60A extends about the first inner-link end portion 40. The second inner-link end edge 60B extends about the second inner-link end portion 42. The pair of first inner-link intermediate edges 60C extends along the first inner-link intermediate portion 44 between the first inner-link end edge 60A and the second inner-link end edge 60B. The first inner-link end portion 40 includes an extended edge portion 61 extending away from the second inner-link end portion 42 in the longitudinal direction D3. The extended edge portion 61 is provided at the first inner-link end edge 60A. However, the extended edge portion 61 can be omitted from the inner link plate 13B of the bicycle chain 13.

As seen in FIG. 19, the third inner-link end portion 50, the fourth inner-link end portion 52 and the second inner-link intermediate portion 54 define a second inner-link outer peripheral edge 62. The second inner-link outer peripheral edge 62 comprises a third inner-link end edge 62A, a fourth inner-link end edge 62B, and a pair of second inner-link intermediate edges 62C. The third inner-link end edge 62A extends about the third inner-link end portion 50. The fourth inner-link end edge 62B extends about the fourth inner-link end portion 52. The pair of second inner-link intermediate edges 62C extends along the second inner-link intermediate portion 54 between the third inner-link end edge 62A and the fourth inner-link end edge 62B.

As seen in FIG. 18, a first maximum distance MD11 is defined from the first inner-link center axis PA1 to the first inner-link end edge 60A in the longitudinal direction D3. A first maximum transverse distance MTD11 is defined from the first inner-link center axis PA1 to the first inner-link end edge 60A in a transverse direction D31 that is perpendicular to the longitudinal direction D3 and the first inner-link center axis PA1. A second maximum distance MD12 is defined from the second inner-link center axis PA2 to the second inner-link end edge 60B in the longitudinal direction D3, In this embodiment, the first maximum distance MD11 is larger than the first maximum transverse distance MTD11. In this embodiment, the second maximum distance MD12 is substantially equal to the first maximum distance MD11. However, the second maximum distance MD12 can be different from the first maximum distance MD11.

As seen in FIG. 19, a third maximum distance MD13 is defined from the third inner-link center axis PA3 to the third inner-link end edge 52A in the additional longitudinal direction D4. A fourth maximum distance MD14 is defined from the fourth inner-link center axis PA4 to the fourth inner-link end edge 52B in the additional longitudinal direction D4.

As seen in FIGS. 18 and 19, the first maximum distance MD11 is larger than the third maximum distance MD13. The third maximum distance MD13 is smaller than the fourth maximum distance MD14. The fourth maximum distance MD14 is substantially equal to the first maximum distance MD11 and the second maximum distance MD12. However, the first maximum distance MD11 can be substantially equal to or smaller than the third maximum distance MD13. The third maximum distance MD13 can be substantially equal to or larger than the fourth maximum distance MD14. The fourth maximum distance MD14 can be different from at least one of the first maximum distance MD11 and the second maximum distance MD12.

As seen in FIG. 18, the inner link plate 13B has a first maximum length ML11 defined between the first inner-link end edge 60A and the second inner-link end edge 60B in the longitudinal direction D3. As seen in FIG. 16, the additional inner link plate 13C has a second maximum length ML12 defined between the third inner-link end edge 52A and the fourth inner-link end edge 52B in the additional longitudinal direction D4. As seen in FIGS. 18 and 19, the first maximum length ML11 is larger than the second maximum length ML12. However, the first maximum length ML11 can be equal to or smaller than the second maximum length ML12.

Figure 20:
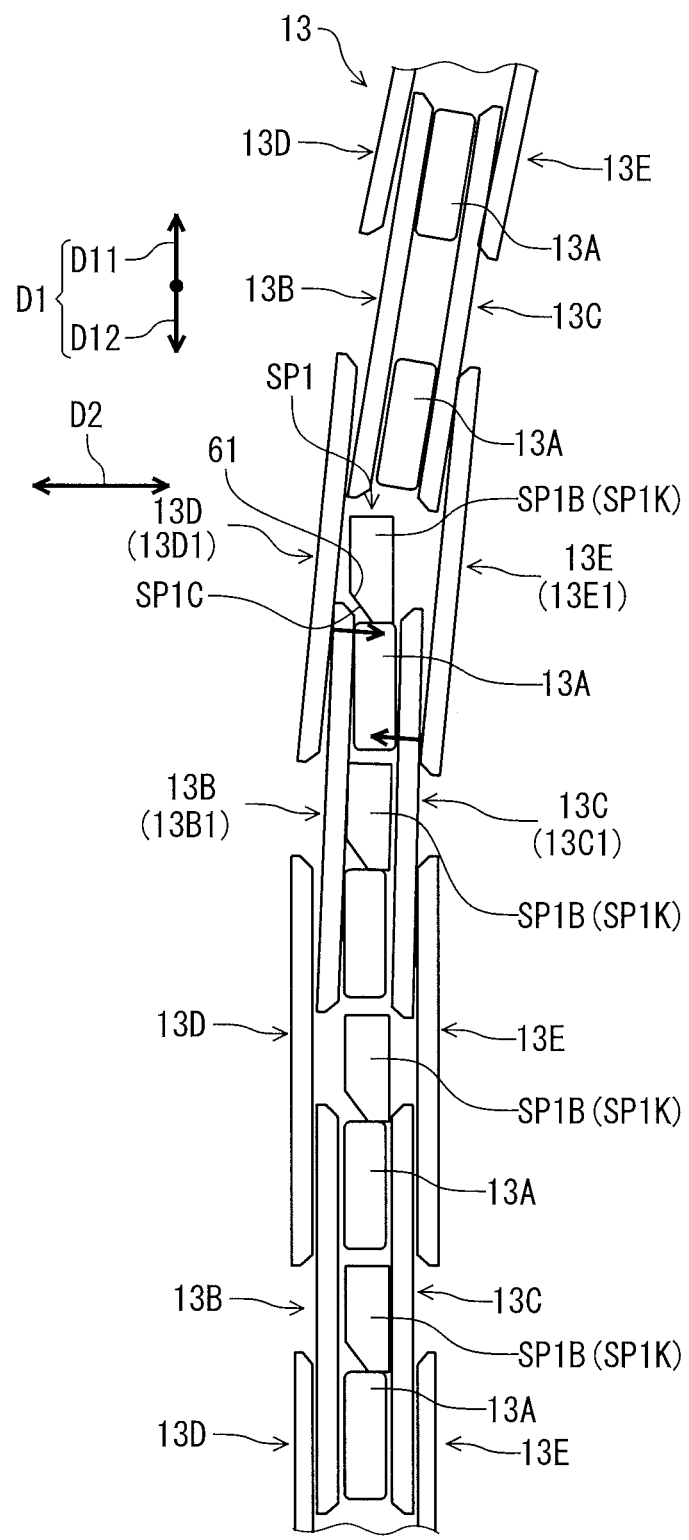
FIG. 20 is a plan view of the bicycle chain with the bicycle rear sprocket illustrated in FIG. 10.

As seen in FIG. 1, for example, the bicycle chain 13 is inclined between the front sprocket CA4 and the bicycle rear sprocket (e.g., the bicycle rear sprocket SP1) relative to a reference plane RP perpendicular to the rotational center axis A1. As seen in FIG. 20, the inner link plate 13B (e.g., the inner link plate 13B1) and the additional inner link plate 13C (e.g., the additional inner link plate 13C1) are pressed by the outer link plate 13D (e.g., the outer link plate 13D1) and the additional outer link plate 13E (e.g., the additional outer link plate 13E1) when the bicycle chain 13 is inclined relative to the reference plane RP. However, since the axial driving-surface tooth-width W12 (FIG. 13) is smaller than the axial maximum tooth-width W11 (FIG. 13), the first tooth SP1K is not squeezed between the inner link plate 13B and the additional inner link plate 13C. This makes rotation of the bicycle rear sprocket SP1 smooth even if the bicycle chain 13 is inclined relative to the reference plane RP.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket comprising:
   a sprocket body; and
   a plurality of sprocket teeth extending radially outwardly from the sprocket body with respect to a rotational center axis of the bicycle rear sprocket, the plurality of sprocket teeth including:
      a plurality of first teeth, each tooth of the plurality of first teeth having a driving surface and a non-driving surface provided on a reverse side of the driving surface in a circumferential direction with respect to the rotational center axis, each tooth of the plurality of first teeth having an axial maximum tooth-width and an axial driving-surface tooth-width, the axial maximum tooth-width being defined in an axial direction of the rotational center axis as a maximum width in each tooth of the plurality of first teeth, the axial maximum tooth-width being defined on a pitch circle of the bicycle rear sprocket, the axial driving-surface tooth-width being defined in the axial direction on the driving surface, the axial maximum tooth-width being larger than 1.6 mm, the axial driving-surface tooth-width is smaller than the axial maximum tooth-width, the plurality of first teeth accounting for at least 25% of the plurality of sprocket teeth, wherein
   at least one tooth of the plurality of first teeth has the axial maximum tooth-width in an area defined to overlap with an inner link plate of a bicycle chain configured to engage with the bicycle rear sprocket when viewed in the axial direction.

2. A bicycle rear sprocket comprising:
   a sprocket body; and
   a plurality of sprocket teeth extending radially outwardly from the sprocket body with respect to a rotational center axis of the bicycle rear sprocket, the plurality of sprocket teeth including:
      a plurality of first teeth, each tooth of the plurality of first teeth having a driving surface and a non-driving surface provided on a reverse side of the driving surface in a circumferential direction with respect to the rotational center axis, each tooth of the plurality of first teeth having an axial maximum tooth-width and an axial driving-surface tooth-width, the axial maximum tooth-width being defined in an axial direction of the rotational center axis as a maximum width in each tooth of the plurality of first teeth, the axial maximum tooth-width being defined on a pitch circle of the bicycle rear sprocket, the axial driving-surface tooth-width being defined in the axial direction on the driving surface, the axial maximum tooth-width being larger than a width of a roller of a bicycle chain configured to engage with the bicycle rear sprocket, the axial driving-surface tooth-width being smaller than the width of the roller, the plurality of first teeth accounting for at least 25% of the plurality of sprocket teeth, wherein
   at least one tooth of the plurality of first teeth has the axial maximum tooth-width in an area defined to overlap with an inner link plate of a bicycle chain configured to engage with the bicycle rear sprocket when viewed in the axial direction.

3. The bicycle rear sprocket according to claim 1, wherein each tooth of the plurality of first teeth has the axial maximum tooth-width in the area defined to overlap with the inner link plate of the bicycle chain configured to engage with the bicycle rear sprocket when viewed in the axial direction.

4. The bicycle rear sprocket according to claim 1, wherein the plurality of first teeth accounts for all teeth of the plurality of sprocket teeth.

5. The bicycle rear sprocket according to claim 1, wherein each tooth of the plurality of first teeth includes
   a first axial surface facing in the axial direction,
   a first additional axial surface facing in the axial direction, the first additional axial surface being provided on a reverse side of the first axial surface in the axial direction, the axial maximum tooth-width being defined between the first axial surface and the first additional axial surface in the axial direction, and
   a chamfer provided between the first axial surface and the driving surface.

6. The bicycle rear sprocket according to claim 5, wherein the chamfer is closer to the first axial surface than the first additional axial surface.

7. A bicycle rear sprocket comprising:
   a sprocket body; and
   a plurality of sprocket teeth extending radially outwardly from the sprocket body with respect to a rotational center axis of the bicycle rear sprocket, the plurality of sprocket teeth including:
      a plurality of first teeth, each tooth of the plurality of first teeth having a driving surface and a non-driving surface provided on a reverse side of the driving surface in a circumferential direction with respect to the rotational center axis, each tooth of the plurality of first teeth having an axial maximum tooth-width and an axial driving-surface tooth-width, the axial maximum tooth-width being defined in an axial direction of the rotational center axis as a maximum width in each tooth of the plurality of first teeth, the axial maximum tooth-width being defined on a pitch circle of the bicycle rear sprocket, the axial driving-surface tooth-width being defined in the axial direction on the driving surface, the axial maximum tooth-width being larger than 1.6 mm, the axial driving-surface tooth-width is smaller than the axial maximum tooth-width, the plurality of first teeth accounting for at least 25% of the plurality of sprocket teeth, wherein
   each tooth of the plurality of first teeth includes
      a first axial surface facing in the axial direction,
      a first additional axial surface facing in the axial direction, the first additional axial surface being provided on a reverse side of the first axial surface in the axial direction, the axial maximum tooth-width being defined between the first axial surface and the first additional axial surface in the axial direction, and
      a chamfer provided between the first axial surface and the driving surface, and
   the axial driving-surface tooth-width is defined between the chamfer and the first additional axial surface on the driving surface.

8. A bicycle rear sprocket comprising:
   a sprocket body; and a plurality of sprocket teeth extending radially outwardly from the sprocket body with respect to a rotational center axis of the bicycle rear sprocket, the plurality of sprocket teeth including:
  a plurality of first teeth, each tooth of the plurality of first teeth having a driving surface and a non-driving surface provided on a reverse side of the driving surface in a circumferential direction with respect to the rotational center axis, each tooth of the plurality of first teeth having an axial maximum tooth-width and an axial driving-surface tooth-width, the axial maximum tooth-width being defined in an axial direction of the rotational center axis as a maximum width in each tooth of the plurality of first teeth, the axial maximum tooth-width being defined on a pitch circle of the bicycle rear sprocket, the axial driving-surface tooth-width being defined in the axial direction on the driving surface, the axial maximum tooth-width being larger than 1.6 mm, the axial driving-surface tooth-width is smaller than the axial maximum tooth-width, the plurality of first teeth accounting for at least 25% of the plurality of sprocket teeth, wherein
  each tooth of the plurality of first teeth includes
    a first axial surface facing in the axial direction,
    a first additional axial surface facing in the axial direction, the first additional axial surface being provided on a reverse side of the first axial surface in the axial direction, the axial maximum tooth-width being defined between the first axial surface and the first additional axial surface in the axial direction, and
    a chamfer provided between the first axial surface and the driving surface, and
  the first axial surface is provided between the first additional axial surface and a bicycle frame in the axial direction in a state where the bicycle rear sprocket is mounted to the bicycle frame.

9. The bicycle rear sprocket according to claim 5, wherein
the chamfer includes a radially outer end and a radially inner end,
the chamfer has a maximum circumferential width defined in the circumferential direction, and
the maximum circumferential width is defined at a radial position provided between the radially outer end and the radially inner end.

10. The bicycle rear sprocket according to claim 1, wherein
the axial maximum tooth-width is larger than 1.9 mm.

11. The bicycle rear sprocket according to claim 1, wherein
at least one of the sprocket body and the plurality of sprocket teeth is made of a first metallic material.

12. The bicycle rear sprocket according to claim 11, wherein
the first metallic material includes aluminum.

13. The bicycle rear sprocket according to claim 1, wherein
the plurality of sprocket teeth includes at least 28 sprocket teeth.

14. The bicycle rear sprocket according to claim 1, wherein
the plurality of first teeth is a plurality of driving teeth.

15. A bicycle rear sprocket assembly comprising:
the bicycle rear sprocket according to claim 1, the bicycle rear sprocket having a first pitch-circle diameter, the first pitch-circle diameter being the largest pitch-circle diameter in the bicycle rear sprocket assembly.

16. The bicycle rear sprocket assembly according to claim 15, further comprising
a hub engagement part configured to engage with the bicycle hub assembly.

17. The bicycle rear sprocket assembly according to claim 16, further comprising
a sprocket support configured to engage with the bicycle hub assembly, the sprocket support including a sprocket attachment part, the bicycle rear sprocket being attached to the sprocket attachment part.

18. The bicycle rear sprocket assembly according to claim 17, wherein
the sprocket support includes the hub engagement part configured to engage with the bicycle hub assembly.

19. A bicycle drive train comprising:
the bicycle rear sprocket according to claim 1; and
a bicycle chain, the bicycle rear sprocket being configured to engage with the bicycle chain, the bicycle chain including an inner link plate having a longitudinal centerline defining a longitudinal direction, the inner link plate comprising:
  a first inner-link end portion including a first inner-link opening having a first inner-link center axis;
  a second inner-link end portion including a second inner-link opening having a second inner-link center axis extending along the first inner-link center axis; and
  a first inner-link intermediate portion interconnecting the first inner-link end portion and the second inner-link end portion, the first inner-link end portion including an extended edge portion extending away from the second inner-link end portion in the longitudinal direction.

20. The bicycle rear sprocket according to claim 2, wherein
the plurality of first teeth accounting for at least 70.6% of the plurality of sprocket teeth.

* * * * *